(12) United States Patent
Wittmeier et al.

(10) Patent No.: US 7,274,850 B2
(45) Date of Patent: Sep. 25, 2007

(54) FIBER OPTIC SPLICE ENCLOSURE

(75) Inventors: David A. Wittmeier, Evanston, IL (US); Carney P. Claunch, II, Rolling Meadows, IL (US); Jeffrey A. Plesniak, Plainfield, IL (US)

(73) Assignee: Charles Industries, Ltd., Rolling Meadows, IL (US)

( * ) Notice: Subject to any disclaimer, the term of this patent is extended or adjusted under 35 U.S.C. 154(b) by 0 days.

(21) Appl. No.: 11/066,081

(22) Filed: Feb. 25, 2005

(65) Prior Publication Data

US 2006/0193587 A1    Aug. 31, 2006

(51) Int. Cl.
G02B 6/44 (2006.01)
G02B 6/46 (2006.01)

(52) U.S. Cl. .................................... 385/135
(58) Field of Classification Search .............. 385/135
See application file for complete search history.

(56) References Cited

U.S. PATENT DOCUMENTS

| | | | |
|---|---|---|---|
| 4,913,522 A | 4/1990 | Nolf et al. | |
| 5,097,529 A | 3/1992 | Cobb et al. | |
| 5,127,082 A | 6/1992 | Below et al. | |
| 5,133,038 A | 7/1992 | Zipper | |
| 5,155,794 A | 10/1992 | Nolf et al. | |
| 5,249,253 A | 9/1993 | Franckx et al. | |
| 5,323,480 A * | 6/1994 | Mullaney et al. | 385/135 |
| 5,602,954 A | 2/1997 | Nolf et al. | |
| 5,734,776 A | 3/1998 | Puetz | |
| 5,764,844 A | 6/1998 | Mendes | |
| 5,774,618 A * | 6/1998 | Jones | 385/135 |
| 5,956,449 A | 9/1999 | Otani et al. | |
| 6,014,490 A | 1/2000 | Canning et al. | |

(Continued)

OTHER PUBLICATIONS

Colored photographs of Emerson Fiber Pedestals; 1 p., Aug. 2004.

(Continued)

*Primary Examiner*—Michelle R. Connelly-Cushwa
(74) *Attorney, Agent, or Firm*—Leydig, Voit & Mayer, Ltd.

(57) ABSTRACT

A fiber optic splice enclosure for housing an interconnection contained in a splice tray between at least one optical fiber of a feeder cable and at least one optical fiber of a drop cable is provided. The optical fiber of the feeder cable is at least partially contained in a spliced feeder cable buffer tube and the optical fiber of the drop cable is at least partially contained in a spliced drop cable buffer tube. The feeder cable or the drop cable includes one or more express buffer tubes that extend uninterrupted through the enclosure. The fiber optic splice enclosure includes a support frame arranged in the enclosure and a basket is arranged on the support frame for storing slack of the spliced feeder cable buffer tube and the spliced drop cable buffer tube transitioning to the splice tray. An express buffer tube storage arrangement is provided on the support frame separate from the basket. A splice tray mounting arrangement is arranged near the basket for supporting the splice tray. The splice mounting arrangement is configured such that the splice tray is removable. The basket is sized so as to be able to store sufficient slack of the spliced feeder cable buffer tube and the splice drop cable buffer tube such that the splice tray can be moved to a working position outside the enclosure.

33 Claims, 23 Drawing Sheets

U.S. PATENT DOCUMENTS

| | | | |
|---|---|---|---|
| 6,167,183 | A | 12/2000 | Swain |
| 6,226,436 | B1 | 5/2001 | Daoud et al. |
| 6,253,016 | B1 | 6/2001 | Daoud |
| 6,275,640 | B1 * | 8/2001 | Hunsinger et al. .......... 385/135 |
| 6,275,641 | B1 | 8/2001 | Daoud |
| 6,292,614 | B1 | 9/2001 | Smith et al. |
| 6,411,767 | B1 * | 6/2002 | Burrous et al. ............ 385/135 |
| 6,434,313 | B1 | 8/2002 | Clapp, Jr. et al. |
| 6,453,107 | B1 * | 9/2002 | Daoud ........................ 385/135 |
| 6,483,977 | B2 | 11/2002 | Battey et al. |
| 6,493,501 | B2 | 12/2002 | Flores et al. |
| 6,496,640 | B1 * | 12/2002 | Harvey et al. .............. 385/135 |
| 6,539,160 | B2 | 3/2003 | Battey et al. |
| 6,542,688 | B1 | 4/2003 | Battey et al. |
| 6,560,394 | B1 | 5/2003 | Battey et al. |
| 6,621,975 | B2 | 9/2003 | Laporte et al. |
| 6,678,457 | B2 | 1/2004 | Kim et al. |
| 6,766,094 | B2 | 7/2004 | Smith et al. |
| 6,778,752 | B2 * | 8/2004 | Laporte et al. ............ 385/135 |
| 6,901,200 | B2 | 5/2005 | Schray |
| 6,916,985 | B1 | 7/2005 | Harwood |
| 7,038,127 | B2 | 5/2006 | Harwood |
| 2002/0051616 | A1 * | 5/2002 | Battey et al. ............... 385/135 |
| 2005/0175307 | A1 * | 8/2005 | Battey et al. ............... 385/135 |
| 2005/0189133 | A1 | 9/2005 | Harwood |
| 2005/0207711 | A1 * | 9/2005 | Vo et al. ...................... 385/94 |
| 2006/0193587 | A1 | 8/2006 | Wittmeier et al. |

OTHER PUBLICATIONS

Colored photographs of Channel Fiber Pedestals, 3 pp., Jan. 2006.

Colored photographs of Channel Fiber Pedestals, 2 pp., Aug. 2004.

CESI Homedome FTTX Pedestal product brochure; 6 pp. (Applicants became aware of around Mar. 2006).

ADC Telecommunications, Inc., OmniReach™ FTTX Solutions 8" Non-Metallic-Fiber Access Terminal product specification; 4 pp., Feb. 2006—Original © 2004.

Corning Cable Systems LLC OptiDrop™ Premier Fiber Pedestal with 4-Port MultiPort, Splice Trays and Slack Storage product specification; 2 pp., Feb. 2006.

ADC Telecommunications, Inc. Multi-Fiber Service Terminal (MST) 6- and 8-Inch Channell Pedestal Installation Instructions technical publication; 1 p., © 2005.

ADC Telecommunications, Inc. Multi-Fiber Service Terminal (MST) 7-Inch ProFORM Pedestal Installation Instructions technical publication; 1 p., © 2005.

Corning Cable Systems LLC, OptiTap™ Connector An Evolant® Solutions Product product specification; 2 pp., Sep. 2005.

Corning Cable Systems LLC, OptiTap™ Hybrid Adapter (OptiTap/SC APC) An Evolant® Solutions Product product specification; 2 pp., Sep. 2005.

Emerson Network Power Energy Systems, North America, Inc., NetSpan™ Integrated Fiber Distribution Terminal Solutions product specification; 4 pp., © 2006.

ADC Telecommunications, Inc., OmniReach™ 12-Inch Fiber Access Terminal Installation Instructions technical publication; 36 pp, ADCP-96-027 Issue 1, Apr. 2005.

AFL Telecommunications a Fujikura Business, Fiber Apparatus—LightLink™ LL-400 Optical Splicing and Distribution Enclosures; 2 pp., © 2002 and 2005 (revised Oct. 11, 2005 and and Jan. 20, 2006).

* cited by examiner

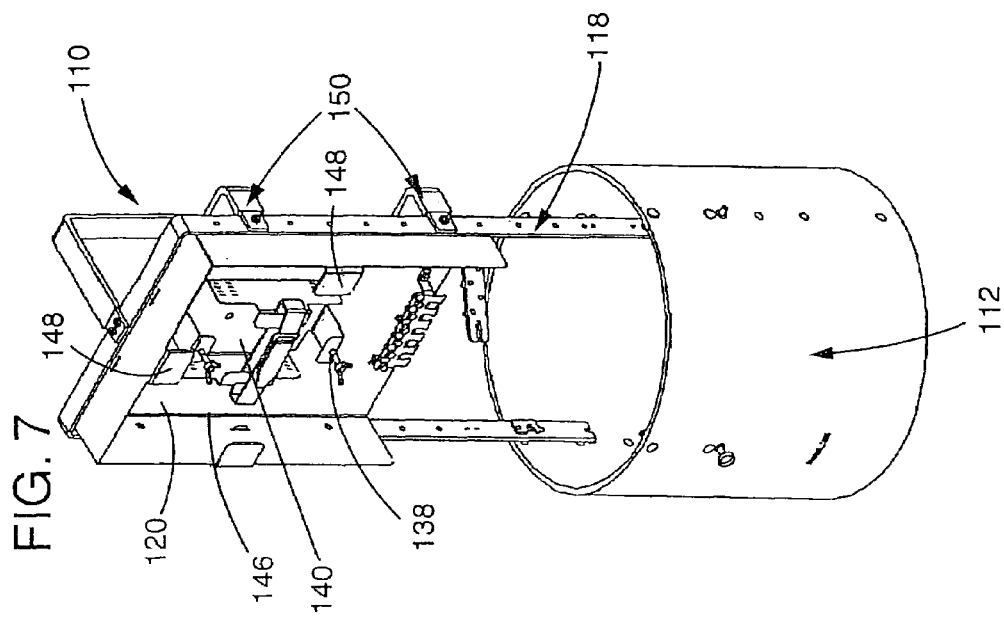
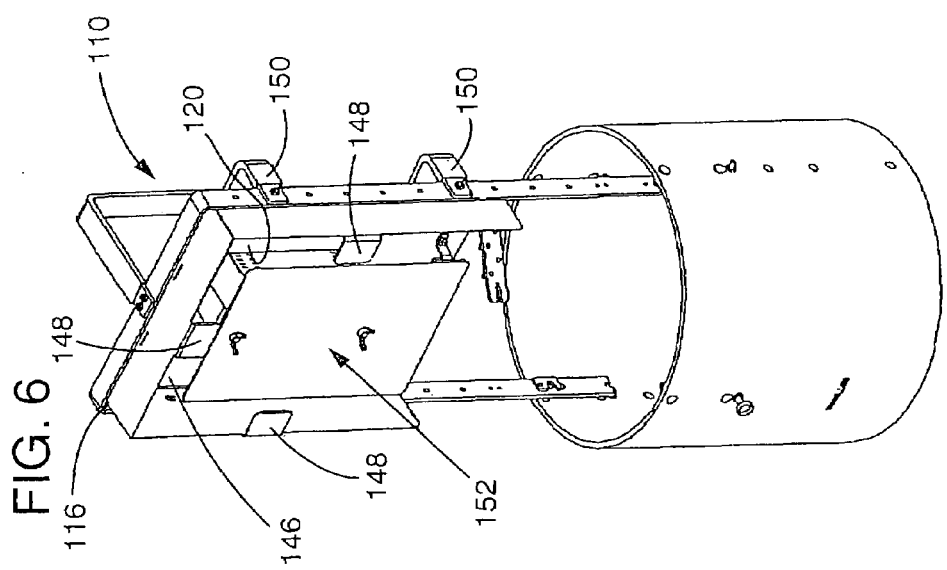

FIBER OPTIC SPLICE ENCLOSURE

FIELD OF THE INVENTION

This invention pertains to enclosures for housing optical fiber interconnections at distribution points in a fiber optic network.

BACKGROUND OF THE INVENTION

There is an ever-increasing demand for high-speed or high-bandwidth communication channels for delivering high-speed data and video services. To meet this demand, telecommunications service providers are developing networks (sometimes referred to as outside plant networks) that extend the higher bandwidth of fiber optic components all the way to the end-user businesses and homes (referred to as premises). In such networks, there are distribution points where a distribution, feeder or branch cable is interconnected with one or more drop cables that are routed to the premises. At such distribution points, the side coming from the service provider is generally referred to as the central office or CO side while the side leading to the premises is generally referred to as the drop side. A distribution, branch or feeder cable typically includes a sheath surrounding a plurality of buffer tubes with each buffer tube housing a plurality of optical fibers.

Enclosures are used to house fiber optic cable interconnections and splices and certain fiber optic components (e.g., splitters and couplers) at various locations in a fiber optic network. Existing fiber optic enclosures, however, are not well suited for use at distribution points close to the end-user premises. Technicians will have to access the interior of the enclosures at such distribution points on a fairly regular basis to add new splices for the premises of additional subscribers or to disconnect service to subscribers canceling service. Vault-type enclosures that are buried in the ground are one type of enclosure commonly used in fiber optic networks. Such vaults are thought to be necessary to protect the integrity of the optical fibers and splices. However, to gain access to the splices in the vault, a bulky lid with multiple bolts must be removed and a sealed splice case, also with multiple fasteners and cable sealing provisions, removed from the interior of the vault. As a result, accessing and servicing such vaults is time-consuming, and thus expensive, making them unsuitable for use at distribution points close to premises that will have to be accessed by technicians on a regular basis.

In addition, performing splicing operations in the field can also be very awkward when working with buried vault enclosures. In particular, when the sealed splice case is removed, lengthy slack fiber loops must also be removed from the vault so that the splice case can reach a clean area where the splicing can be performed. Once the splice case is situated in the clean splicing area, actually gaining access to the splices can sometimes involve the removal of over a dozen threaded fasteners. Once the splicing operation is completed, these steps must be repeated in order to replace the splice case back in the vault. Failure to properly reseal the cable openings and tighten the fasteners often results in water leakage into the splice case that may cause undesirable optical signal degradation.

The routing and management of the fiber optic cables in such vaults can also lead to problems. For example, with such vaults, there is a significant risk that a technician will disrupt the unopened buffer tubes (known as "express buffer tubes") that extend in an uninterrupted manner through the vault in the course of performing the splicing operation. Obviously, this issue is of particular significance when the vault is being used at a distribution point to premises that will have to be accessed frequently for field splicing operations. The cable routing and management in such vaults can also be quite complicated further increasing the potential for errors by technicians performing work on the equipment in the vault. Other types of enclosures used in fiber optic networks have similar issues and drawbacks.

It can be relatively difficult and time consuming to separate the express buffer tubes from the spliced buffer tubes and find the appropriate optical fibers when adding or reconfiguring splices to drop cables in an enclosure. Also difficult and time consuming to access the splice tray to perform the splicing operation without damaging the express buffer tubes. Thus, such field splicing operations frequently require a highly skilled technician. However, highly skilled technicians are expensive.

BRIEF SUMMARY OF THE INVENTION

The invention provides a fiber optic splice enclosure for housing an interconnection contained in a splice tray between at least one optical fiber of a feeder cable and at least one optical fiber of a drop cable. The optical fiber of the feeder cable is at least partially contained in a spliced feeder cable buffer tube and the optical fiber of the drop cable is at least partially contained in a spliced drop cable buffer tube. The feeder cable or the drop cable includes one or more express buffer tubes that extend uninterrupted through the enclosure. The fiber optic splice enclosure includes a support frame arranged in the enclosure and a basket arranged on the support frame for storing slack of the spliced feeder cable buffer tube and the spliced drop cable buffer tube transitioning to the splice tray. An express buffer tube storage arrangement is provided on the support frame separate from the basket. A splice tray mounting arrangement is arranged near the basket for supporting the splice tray. The splice mounting arrangement is configured such that the splice tray is removable. The basket is sized so as to be able to store sufficient slack of the spliced feeder cable buffer tube and the splice drop cable buffer tube such that the splice tray can be moved to a working position outside the enclosure.

The invention further provides a fiber optic splice enclosure for housing an interconnection between at least one optical fiber of a feeder cable and at least one optical fiber of a drop cable. The spliced optical fiber of the feeder cable is at least partially contained in a spliced feeder cable buffer tube and the spliced optical fiber of the drop cable is at least partially contained in a spliced drop cable buffer tube. The spliced feeder cable buffer tube is connected to a pigtail or transport tube through a first splice tray and the spliced drop cable buffer tube is connected to a pigtail or a transport tube through a second splice tray. The feeder cable or the drop cable includes one or more express buffer tubes that extend uninterrupted through the enclosure. The fiber optic splice enclosure includes a support frame arranged in the enclosure. The support frame includes a central office side and a drop side. A first basket is arranged on the central office side of the support frame for storing slack of the spliced feeder cable buffer tube and the pigtail or transport tube transitioning to the first splice tray. A first splice tray mounting arrangement is carried by the support frame and arranged near the first basket for supporting the first splice tray. The first splice mounting arrangement is configured such that the first splice tray is removable and wherein the first basket is sized so as to be able to store sufficient slack of the spliced feeder cable buffer tube and pigtail or transport tube such that the first splice tray can be moved to a working position outside the enclosure. A second basket is arranged on the drop side of the support frame for storing slack of the spliced drop cable buffer tube and pigtail or transport tube transitioning to the second splice tray. A second splice tray mounting arrangement is arranged near the second basket for supporting the second splice tray. The splice mounting arrangement is configured such that the second splice tray is removable and wherein the second basket is sized so as to be able to store sufficient slack of the spliced drop cable buffer tube and transport tube or pigtail such that the second splice tray can be moved to a working position outside the enclosure.

BRIEF DESCRIPTION OF THE DRAWINGS

FIG. 6 is a front perspective view of an alternative embodiment of a fiber optic splice enclosure according the present invention (with the cover removed) that also includes copper cable splice brackets.

FIG. 7 is a front perspective view of the fiber optic splice enclosure of FIG. 6 with the shield removed.

DETAILED DESCRIPTION OF THE INVENTION

Figure 1:
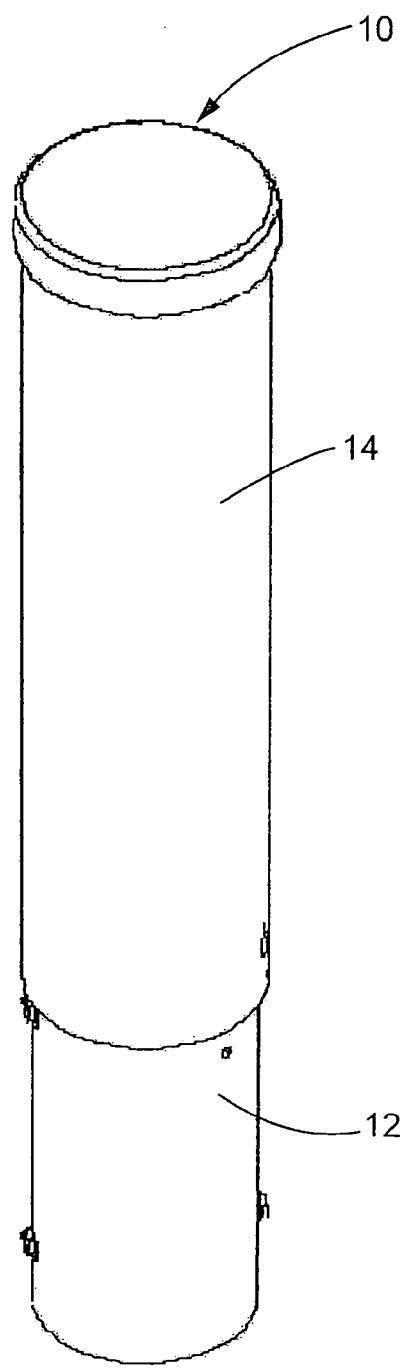
FIG. 1 is a perspective view of an exemplary fiber optic splice enclosure according to the present invention.
Figure 2:
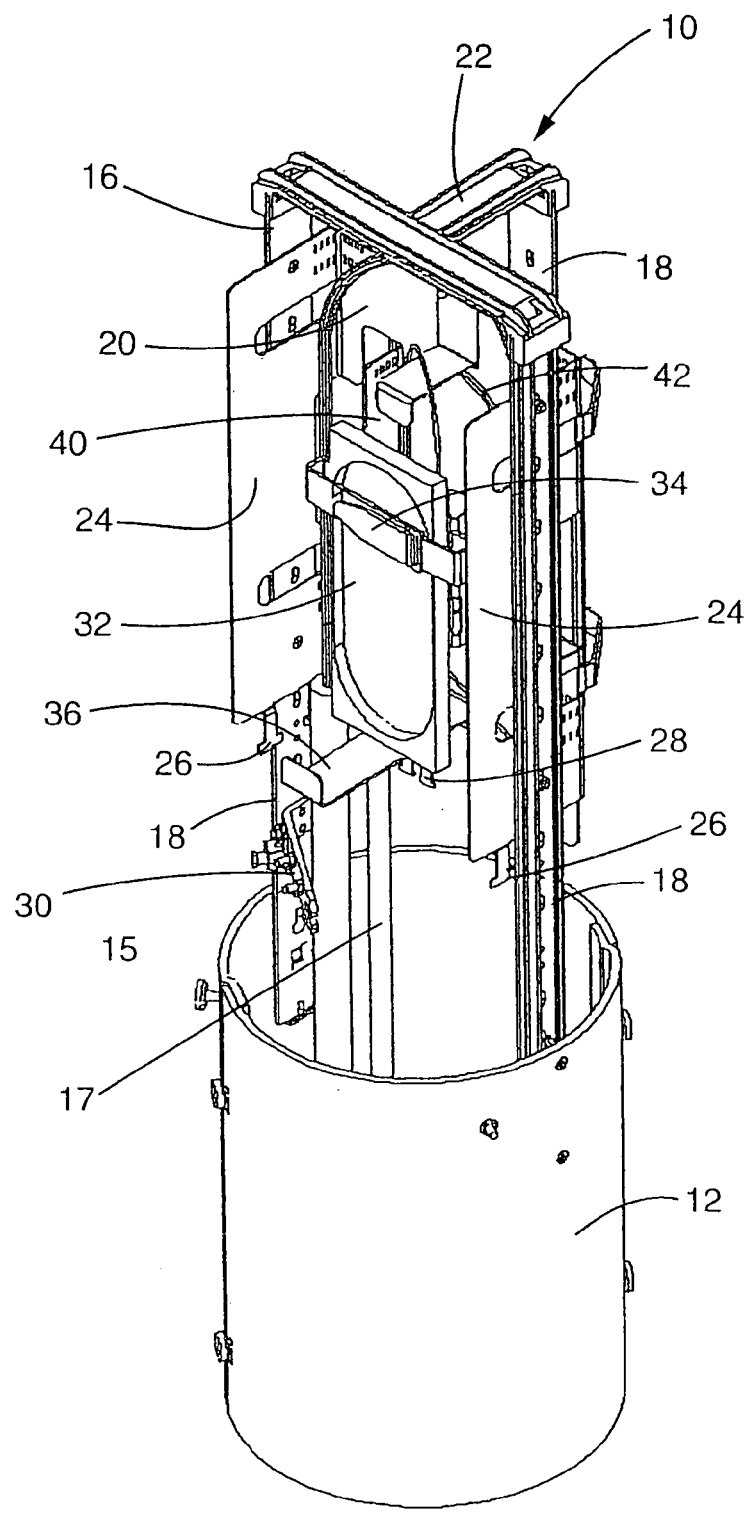
FIG. 2 is a front perspective view of the fiber optic splice enclosure of FIG. 1 with the cover removed.

Referring now to FIGS. 1 and 2 of the drawings, there is illustrated an exemplary fiber optic splice enclosure 10 constructed in accordance with the teachings of the present invention. The illustrated fiber optic splice enclosure 10 has a pedestal configuration that includes a base section 12 and a cover or dome 14. In this case, the cover 14 nests in a telescoping fashion over the base section 12 so as to define an interior space within the enclosure 10 that can house fiber optic splice connections and other telecommunications equipment. Inside the enclosure 10, the splices and other equipment are protected against damage from water, fire, wind-blown dust and debris and impact. When in use, at least a portion of the base section 12 is typically filled with dirt and/or gravel and buried in the ground. Fiber optic cables can be fed into the interior space of the splice enclosure 10 through one or more openings in the base section 12.

The use of the pedestal configuration for the fiber optic splice enclosure 10 offers several important advantages over other structures such as vaults. For instance, the pedestal configuration provides technicians with 360° access to the interior space of the enclosure for performing maintenance and installation work. The pedestal configuration also provides a bell-jar effect, which results in superior flood protection as compared to other types of enclosures. Preferably, the base and cover 12, 14 of the splice enclosure 10 are made of non-metallic materials such as plastics that will not rust, corrode, chip or fade. While a non-metallic pedestal type configuration offers several advantages, those skilled in the art will appreciate that the present invention is not limited to enclosures having any particular size or configuration or to enclosures that are made of any particular material.

The fiber optic splice enclosure 10 of the present invention is particularly suited for fiber to the premises applications. In such applications, a fiber optic splice enclosure is fed by a fiber optic feeder cable in communication with equipment at the service provider and one or more fiber optic drop cables that are routed to premises (e.g., homes or businesses). As noted above, the side coming from the service provider is generally referred to as the central office or CO side while the side leading to the premises is generally referred to as the drop side. The fiber optic feeder cables and the fiber optic drop or branch cables typically comprise a sheath surrounding a plurality of buffer tubes with each buffer tube housing a plurality of optical fibers either loosely or in a ribbon configuration. In the enclosure, at least some of the optical fibers of the feeder cable are spliced or otherwise interconnected to optical fibers of the branch or drop cables while other optical fibers and their associated buffer tubes or other ribbon fibers extend uninterrupted through the enclosure. The buffer tubes containing the unspliced optical fibers are generally referred to as express buffer tubes. As used herein, the term express buffer tubes will also encompass ribbon fibers that extend uninterrupted through the enclosure. Moreover, as used herein the term drop cable shall also encompass branch cables. In the drawings, the feeder cables are generally identified by reference number 15, the drop cables are identified by reference number 17 and the express buffer tubes are identified by reference number 19. For clarity purposes, the drawings generally only show a single feeder cable and/or a single drop cable, however, it will be understood by those skilled in the art that the fiber optic splice enclosure of the present invention could be used in situations involving multiple feeder cables and/or multiple drop cables.

To support and organize the optical fiber feeder and drop cables 15, 17 and the associated buffer tubes, optical fibers and splices along with any other telecommunications equipment housed in the fiber optic splice enclosure 10, the illustrated enclosure includes an internal support frame 16. The internal support frame 16 includes a plurality of legs 18 that support a backboard 20 with each leg being connected to the base section 12 of the enclosure. In the embodiment illustrated in FIGS. 1-5, the support frame 16 includes three legs 18 that are interconnected at their upper ends through a T-shaped header 22. Additionally, opposing sideboards 24 are provided on two of the legs 18 of the support frame 16. A mounting arrangement that permits quick and easy mounting and removal of the internal support frame 16 to and from the base section 12 without the use of any tools can be utilized. With such a mounting arrangement, the internal frame is simply slid onto complementary mounting parts provided on the base section and automatically locked into position. The internal frame can then be removed simply by manually releasing a locking mechanism form engagement with the internal frame. Additional details regarding such a mounting arrangement can be found in commonly owned, co-pending application Ser. No. 10/789,145 entitled "Universal Mounting Arrangement For Components Of An Electronics Enclosure," the disclosure of which is incorporated herein by reference.

For securing the feeder cables and drop cables 15, 17 that are fed to the fiber optic splice enclosure 10, the support frame 16 includes feeder cable and drop cable mounting structures. In the embodiment illustrated in FIGS. 1-5, the feeder cable mounting structures comprise a plurality of tabs or brackets 26 that are provided at the lower edges of the opposing sideboards 24 of the support frame 16. Each feeder cable 15 fed to the enclosure can be attached to a respective one of these brackets 26 via a suitable strain-relief coupling using known techniques. Similarly, the drop cable mounting structures comprise a plurality of tabs or brackets 28 arranged at the lower edge of the backboard 20 of the internal support frame 16. Each drop cable 17 associated with the splice enclosure 10 can be secured to a respective one of these brackets 28 via a suitable strain-relief coupling using known techniques. In the illustrated embodiment, the internal support frame 16 also includes a bonding bar 30 for providing a ground connection for the equipment and fiber cable housed in the fiber optic splice enclosure 10. The bonding bar 30 can be made of metal or any other electrically conductive material.

For housing interconnections or splices between respective pairs of optical fibers from the feeder cable 15 and the drop cables 17 and fiber optic passive components such as splitters or couplers and protecting such splices and equipment from damage, one or more splice trays 32 are removably mountable on the internal support frame of the enclosure. In this case, the splice trays 32 are mounted in a generally central location on the backboard 20 of the support frame 16 such that they are easily accessible by field technicians for removal for a field splicing operation. Each of the splice trays 32 is secured in position on the support frame 16 so that it cannot shift or otherwise move in a manner that would damage the optical fiber interconnections.

The splice trays 32 can be secured in position using any suitable mounting technique. For instance, in the embodiment illustrated in FIGS. 1-5, the backboard 20 of the internal support frame 16 includes a strap 34, such as a hook and loop strap, that wraps around the trays 32 and helps secure them in position. As best shown in FIGS. 2 and 4, the backboard 20 further includes a splice tray support 36 that cantilevers outward from the backboard so as to provide a ledge on which the lower edges of the splice trays 32 can rest. Alternatively or additionally, the fiber optic splice enclosure 10 can include one or more posts 138 (see FIG. 7) that align with features on the splice trays 32 such that the splice trays can be mounted in the enclosure on the posts such as shown in the embodiment of FIGS. 6 and 7. With such an arrangement, the end of the posts can be threaded so that a threaded fastener can then be applied to the end of the post to secure the splice trays 32 in position on the posts.

To facilitate organization of the spliced buffer tubes and optical fibers and the express buffer tubes and optical fibers as well ensure efficient utilization of the interior space of the enclosure, the internal support frame 16 includes several tube/fiber organizing features. One such feature is a structure or basket 40 for storing or containing the buffer tubes from the feeder cables and drop cables that include the optical fibers which are spliced together in the splice trays (these "spliced buffer tubes" are identified by reference number 42 in the drawings). In particular, on the side of each splice tray 32 connected to the feeder cable buffer tubes and the side of each splice tray connected to the drop cable buffer tubes, lengthy slack buffer tube loops must be provided to allow the splice tray to be detached and pulled away from the internal support frame 16 for splicing operations (see, e.g., FIG. 3). These spliced buffer tube slack loops can be stored in the spliced slack storage basket 40 where they are kept separate from the express buffer tubes 19 that extend in an uninterrupted manner (i.e., unspliced) through the fiber optic splice enclosure 10.

The spliced slack storage basket 40 provides a clear demarcation between the spliced buffer tubes 42 and the express buffer tubes 19. This substantially simplifies management of the cables and buffer tubes both when a technician initially installs the fiber optic splice enclosure 10 (i.e., makes the interconnections between the optical fibers in the feeder cable 15 and the optical fibers in the drop cable 17) and when the enclosure is updated such as when splices are added or reconfigured. For example, the separate storage of the spliced buffer tubes 42 allows technicians to access the spliced buffer tubes and the splice trays 32 in the field (i.e., at the installed enclosure) with minimal disruption to the express buffer tubes 19. Thus, the spliced slack storage basket 40 allows the splicing operation to be performed more quickly and with less chance that the express buffer tubes 19 are damaged when the work is performed. The separate storage of the spliced buffer tubes 42 and the express buffer tubes 19 also produces a more efficient utilization of the available space inside the enclosure 10 thereby allowing the enclosure to be smaller in size.

In the embodiment of the invention illustrated in FIGS. 1-5, the spliced slack storage basket 40 is defined by four sidewalls 44 provided on the backboard 20 of the internal support frame 16 as best shown in FIG. 4. In this case, each sidewall 44 of the basket 40 has a generally L-shaped configuration with one leg extending outward from the backboard and a second leg extending inward in generally perpendicular relation to the first leg. The second legs of the sidewalls 44 help keep the spliced slack loops contained within the basket 40. In the illustrated embodiment, the sidewalls 44 of the basket 40 do not interconnect with each other, although such a configuration is within the scope of the present invention. Advantageously, in the illustrated embodiment, the spliced slack storage basket 40 also provides the structure on which the splice trays 32 are mounted (see FIG. 2). Thus, when the splice trays 32 are secured to the internal support frame 16, they are secured over the basket 40 thereby providing further protection to the slack spliced buffer tubes 42. Preferably, the sidewalls 44 of the basket extend away from the backboard 20 a sufficient length and are spaced from each other a sufficient distance to ensure that enough slack can be stored in the basket 40 to allow splicing operations to be performed in relatively close proximity to the installed enclosure. As will be appreciated, the size of the spliced slack storage basket 40 should also take into account the minimum allowable bend radius of the optical fibers in the buffer tubes.

As noted above, the fiber optic splice enclosure 10 of the present invention includes a separate area or arrangement for storage of the express buffer tubes. In certain applications, the express buffer tube storage arrangement or area can also be used to store extra branch or drop cable slack storage. In the embodiment of the invention illustrated in FIGS. 1-5, the express buffer tube storage arrangement or area 46 is arranged on the opposite side of the backboard 20 from the spliced slack storage basket 40 (see FIG. 5). More specifically, the express buffer tube storage area 46 is defined by a plurality of cable guides 48 that are arranged generally around the perimeter of the backboard 20 so as to define an area within which the slack of the express buffer tubes 19 can be coiled. In the illustrated embodiment, each of the cable guides 48 extends generally outward from the backboard 20 and then inwardly towards the longitudinal axis of the enclosure. As will be appreciated from the following discussion of further embodiments of the present invention, the express buffer tube storage area can have different configurations and be arranged in different locations.

Figure 3:
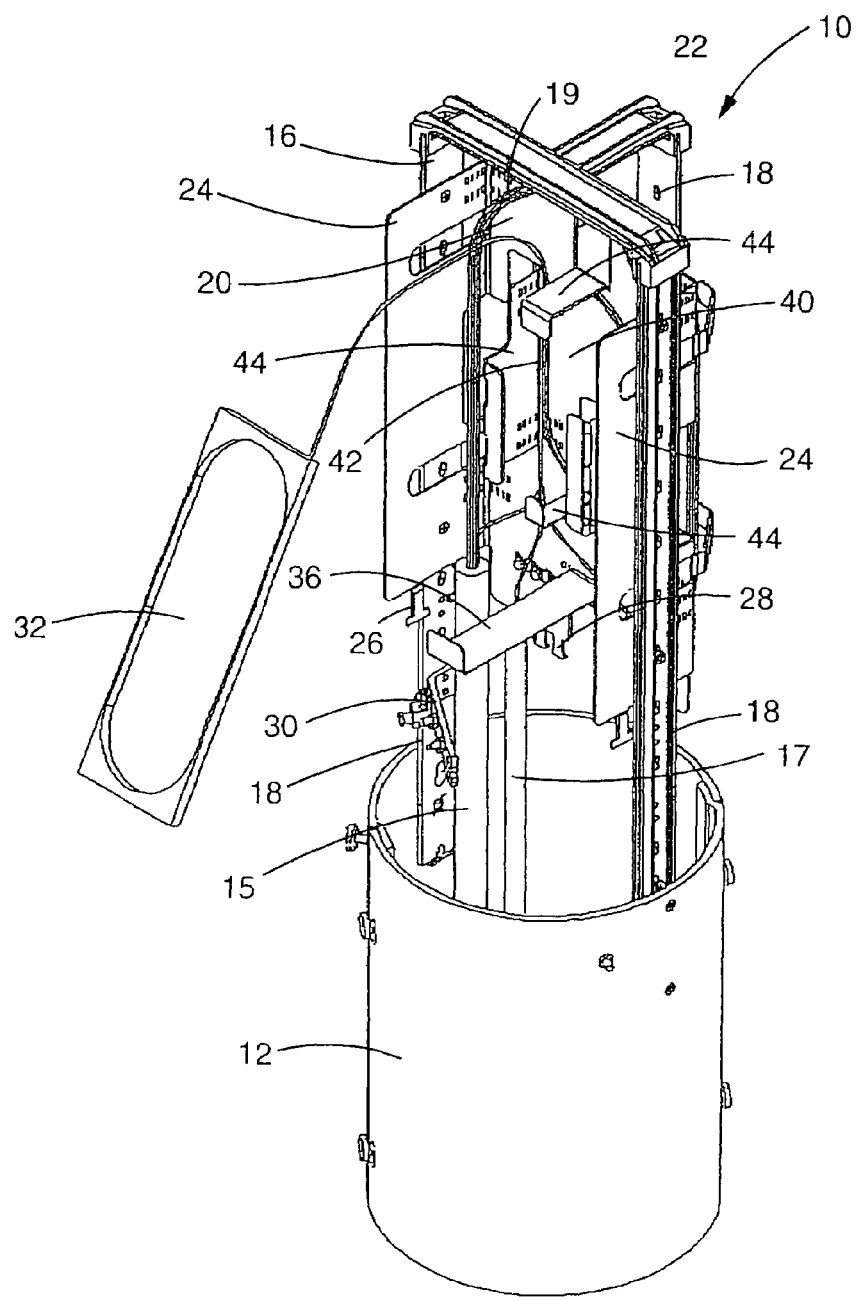
FIG. 3 is a front perspective view of the fiber optic splice enclosure of FIG. 1 with the cover removed and the splice tray detached and pulled out from the internal support frame.
Figure 4:
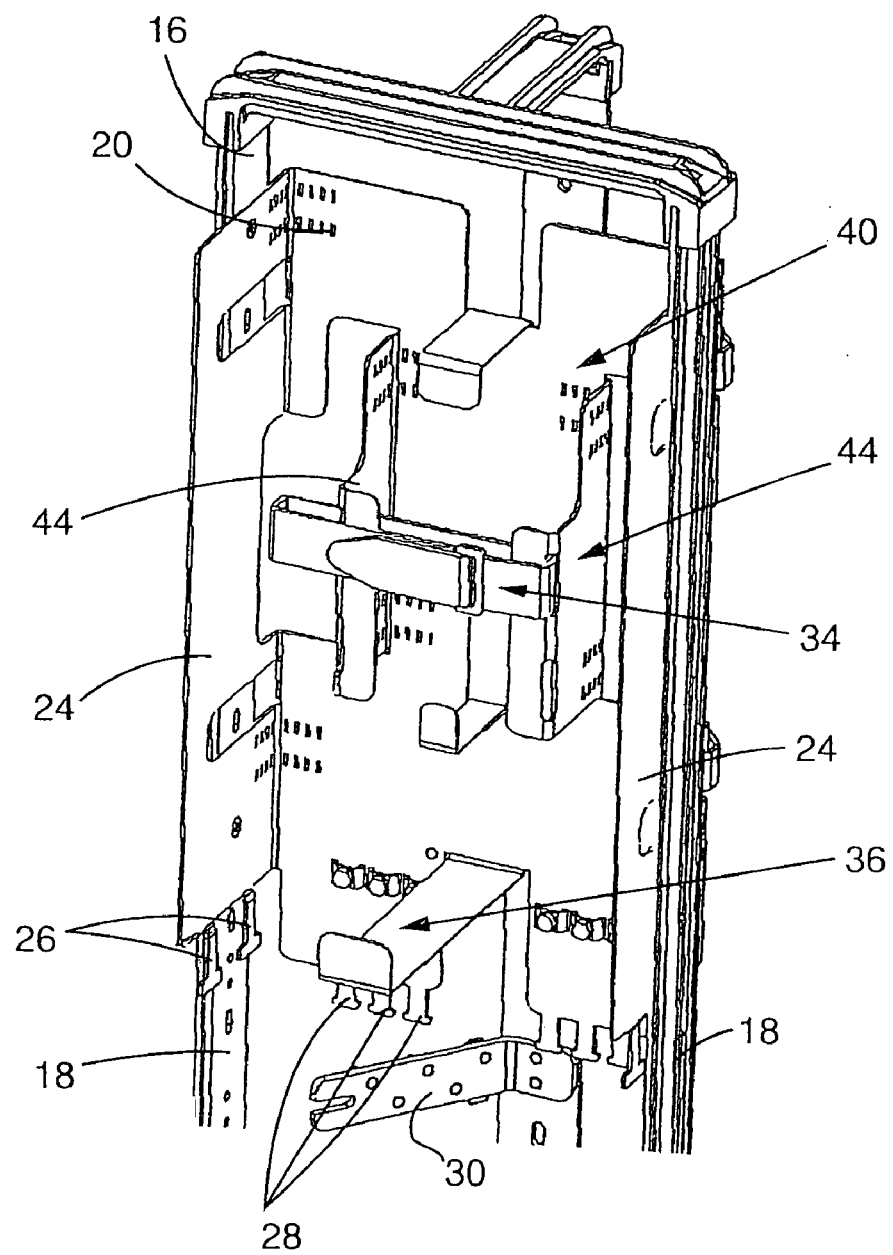
FIG. 4 is an enlarged front perspective view of the fiber optic splice enclosure of FIG. 1 showing the splice tray buffer tube containment structure or basket.
Figure 5:
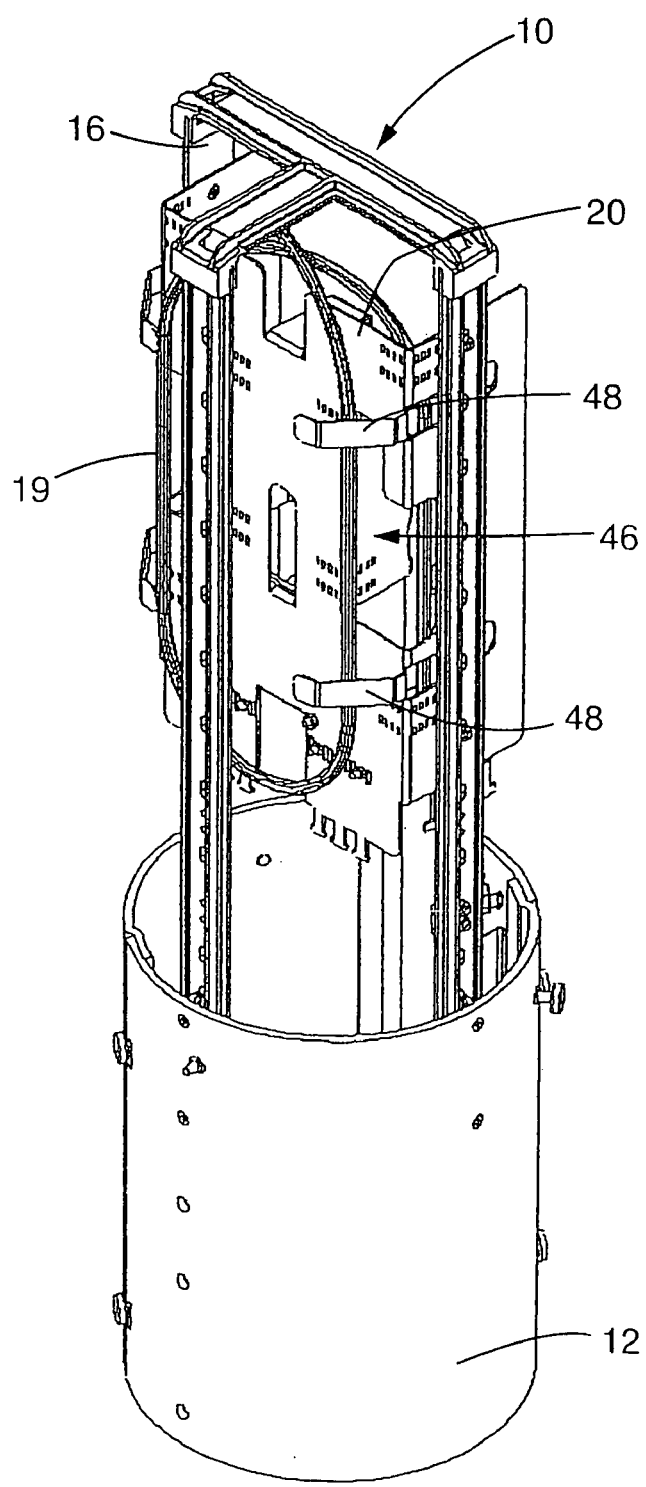
FIG. 5 is a rear perspective view of the fiber optic splice enclosure of FIG. 1 with the cover removed and showing the slack buffer tube storage system.
Figure 8:
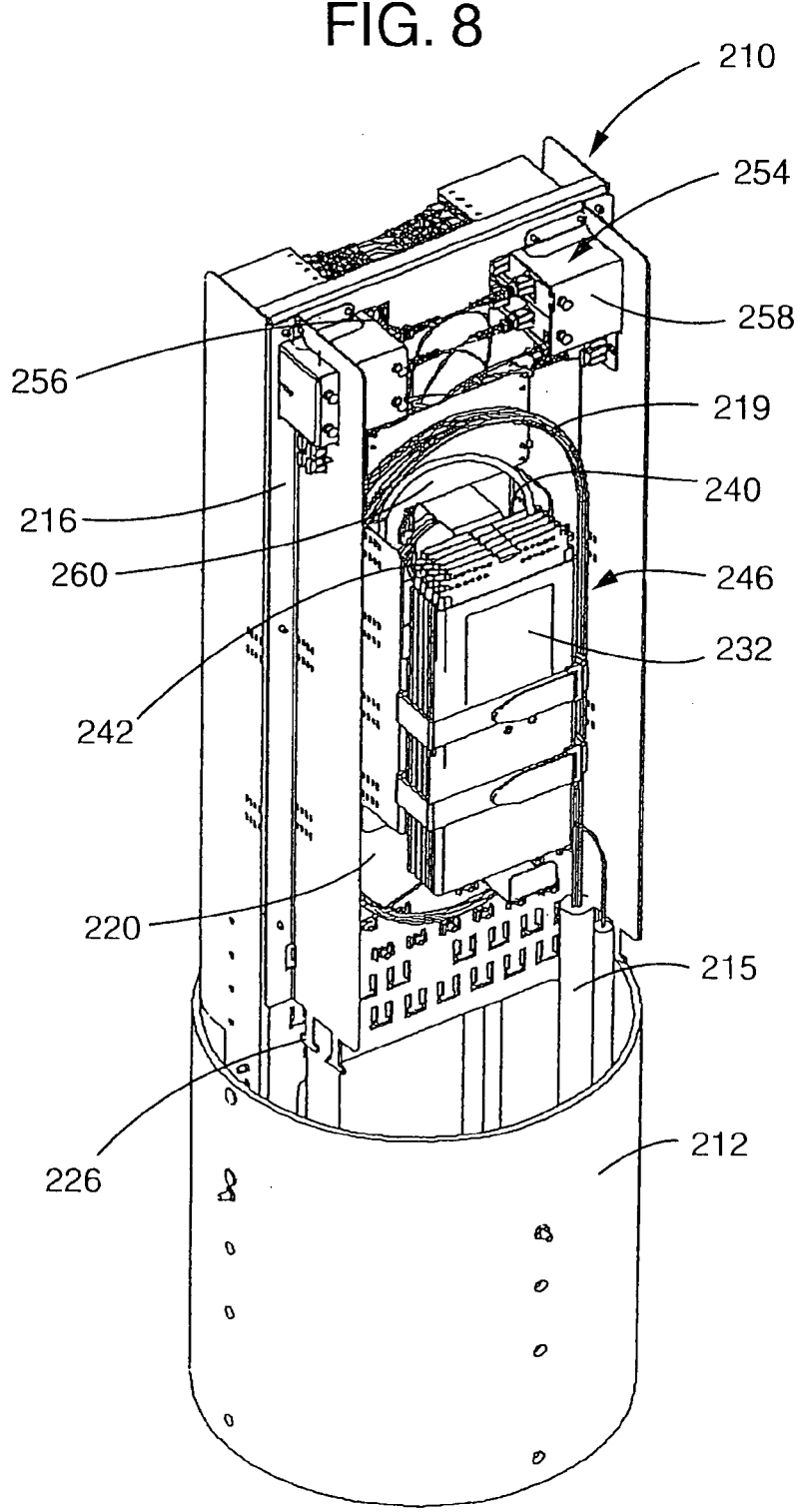
FIG. 8 is a front perspective view of another alternative embodiment of a fiber optic splice enclosure according to the present invention (with the cover removed) showing the central office side of the enclosure and a connectorized interface between the central office side and the drop side of the enclosure.
Figure 9:
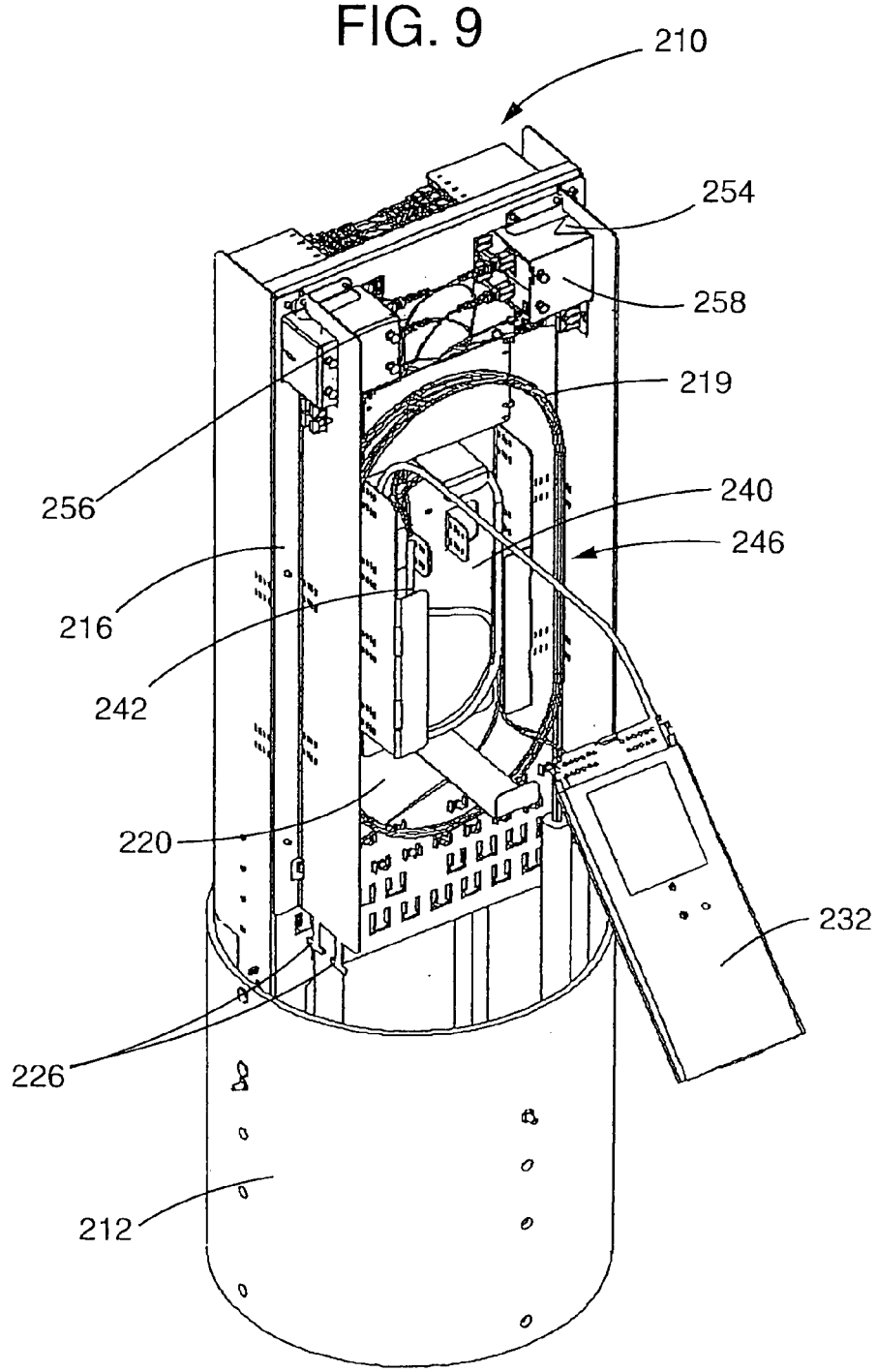
FIG. 9 is a front perspective view of the fiber optic splice enclosure of FIG. 8 showing one of the splice trays detached and pulled out from the central office side of the internal support frame.

When the embodiment of FIGS. 1-5 is used, a feeder cable 15 that enters the enclosure from below is coupled to one of the feeder cable mounting brackets 26 on one of the legs on the internal support frame 16 (see FIGS. 2 and 3). The feeder cable is also coupled to one of the feeder cable mounting brackets on the opposite legs where it exits the enclosure. The express buffer tubes 19 of the feeder cable are separated from the buffer tubes 42 that are to be spliced and routed to the express buffer tube storage area 46 on the rear side of the backboard 20 (see FIG. 5) where they are out of the way and protected from damage during subsequent splicing operations. The one or more buffer tubes 42 that are to be spliced to the drop cables 17 remain on the front side of the backboard 20 and transition into the spliced slack storage basket 40. The drop cables 17 fed into the enclosure 10 are connected to the drop cable mounting brackets 28 on the lower edge of the backboard 20. The buffer tubes 42 from these drop cables are then transitioned into the basket 40 as well. The buffer tubes from the feeder cable and the drop cable are then attached to the splice tray 32 (see generally FIG. 3) and the optical fibers are spliced together (e.g., using either mechanical or fusion splicing). Once the splicing is complete, the spliced buffer tubes 42 are wrapped into the spliced slack storage basket 40 and the splice trays 32 are mounted onto the basket and secured in place using the strap 34.

A further embodiment of a splice enclosure according to the present invention is illustrated in FIGS. 6 and 7. In the drawings and description of embodiment of FIGS. 6 and 7, elements the same or generally similar to those in the embodiment of FIGS. 1-5 are identified with the same reference number in the 100s series (e.g., splice enclosure 110). In contrast to the embodiment of FIGS. 1-5, the express buffer tube storage area 146 is arranged on the front of the backboard 120 in the FIGS. 6 and 7 embodiment. In particular, the express buffer tube storage area 146 is arranged in surrounding relation to the spliced slack storage basket 140. The express buffer tube storage area 146 is defined, in this case, by a plurality of cable guides 148 arranged around the perimeter of the front side of the backboard 120 so that the spliced slack storage basket 140 is arranged in the center of the express buffer tube slack loops. The opposing side of the backboard in the FIGS. 6 and 7 embodiment is configured with brackets 150 for receiving copper cable splices so that the enclosure 110 can serve as an interconnection point for both fiber optic cables and for copper cables. The fiber optic splice enclosure 110 illustrated in FIGS. 6 and 7 also includes a shield 152 that can be placed over the splice trays to provide further protection for the trays and the spliced buffer tubes.

A further embodiment of an enclosure according to the present invention which includes discrete central office and drop sides with a connectorized interface therebetween is illustrated in FIGS. 8-12. In the drawings and description of embodiment of FIGS. 8-12, elements the same or generally similar to those in the embodiment of FIGS. 1-5 are identified with the same reference number in the 200s series (e.g., splice enclosure 210). In the FIGS. 8-12 embodiment, the central office (FIGS. 8 and 9) and the drop sides (FIG. 10) of the support frame 216 have similar but distinct functions and configurations. In particular, both sides have mounting tabs 226, 228 for the attachment of the feeder or drop cables, spliced slack storage baskets 240, splice trays 232 and a connector adaptor interface 254. Having discrete central office and drop sides facilitates separation of the splicing to the central office feeder cable and the splicing to homes or offices which can be particularly useful in situations where different technicians perform the splicing on the central office and drop sides. Instead of having the optical fibers of the feeder cable 215 spliced directly to the optical fibers of the drop cables 217, in the FIGS. 8-12 embodiment, the optical fibers of the drop cables and the optical fibers of the feeder cable are first spliced to a short length of jacketed optical fiber that has an optical connector attached at the other end (commonly referred to as a "pigtail"; generally identified with reference number 256 in the drawings on the central office side and with reference number 257 on the drop side). The pigtails 256 are then connected to opposite sides of the connector adaptor interface 254 to interconnect the feeder cable 215 with the drop cables 217.

In this case, on the central office side (see FIGS. 8 and 9), the express buffer tubes 219 are separated from the buffer tubes of the feeder cable 215 that are going to be spliced. The express buffer tubes 219 are routed to the express buffer tube storage area 246, which in this case is around the spliced slack storage basket 240 (best shown in FIG. 9). Thus, the express buffer tubes 219 are coiled around the spliced slack storage basket 240. The one or more buffer tubes 242 that are to be spliced are transitioned into the spliced slack storage basket 240 and are then connected to one of the splice trays 232. One or more corresponding pigtails 256 are also connected to the splice tray. Any slack portions of the pigtails 256 can be stored in the spliced slack storage basket 240 and the ends of the pigtails having the connectors are routed up to the connector adaptor interface 254, which in this case is arranged near the top of the backboard 220 of the internal support frame 216.

Figure 10:
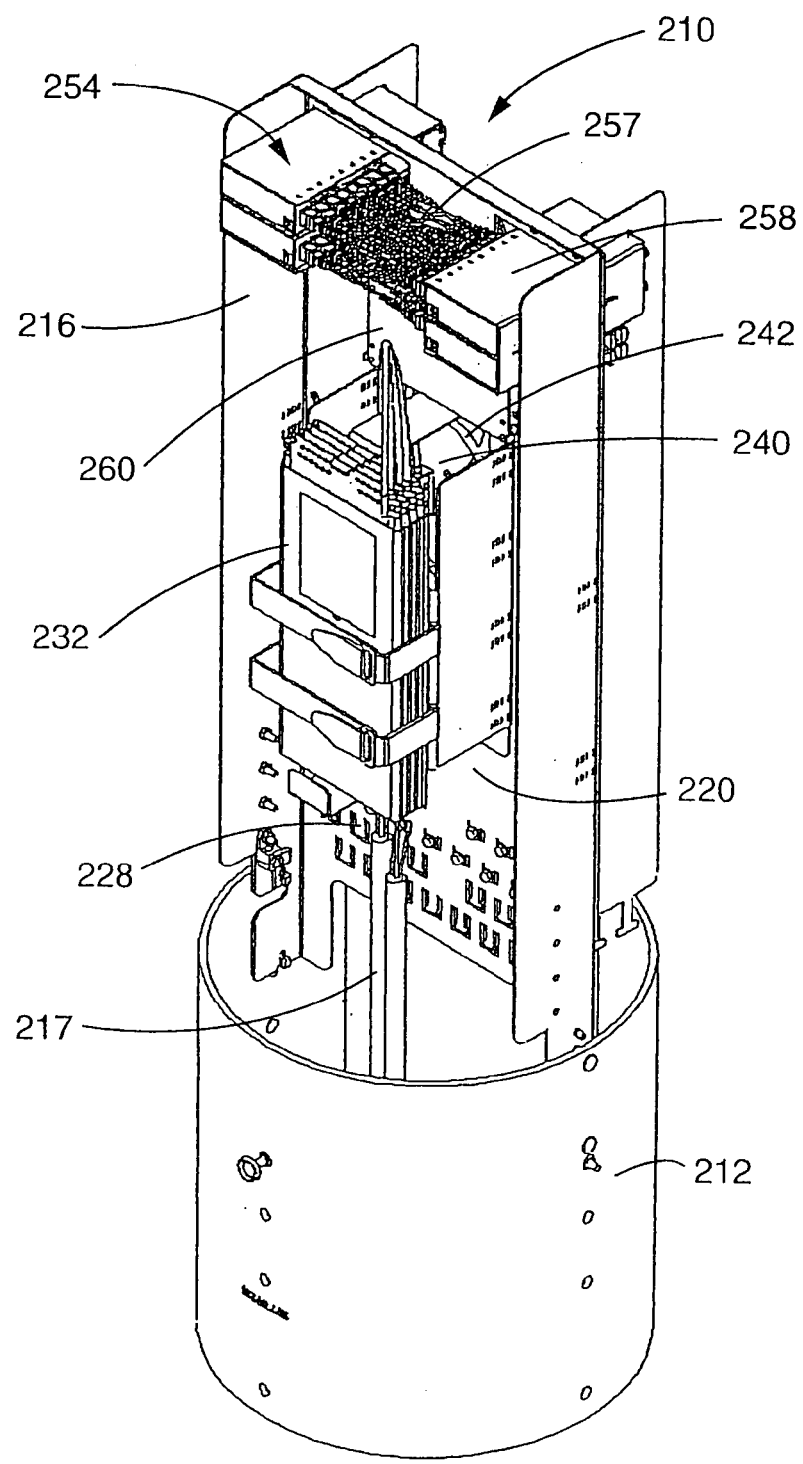
FIG. 10 is a rear perspective view of the fiber optic splice enclosure of FIG. 8 showing the drop side of the enclosure.

In order to allow each individual pigtail 256 from the central office side to be connected to multiple pigtails 257 on the drop side, the connector adaptor interface 254 includes fiber optic splitter modules 258. In the illustrated embodiment, the connector adaptor interface 254 includes four splitter modules 254, each of which is capable of splitting one pigtail 256 from the central office side (FIGS. 8 and 9) into eight pigtails 257 on the drop side (FIG. 10). As will be appreciated, the fiber optic splice enclosure 210 could include any number of splitter modules 258 (e.g., the illustrated embodiment could have one to four splitter modules) as well as splitter modules that split the central office side pigtails into different numbers of pigtails on the drop side (e.g., thirty-two drop side pigtails for every central office pigtail).

On the drop side (see FIG. 10), the connector end of the pigtails 257 are connected to the connector adaptor interface 254 while the other ends are routed to the spliced slack storage basket 240 and connected to the splice trays 232 on the drop side of the enclosure. The buffer tubes 242 of the drop cables 217 are also transitioned into the spliced slack storage basket 240 and also connected to the splice trays 232 and the drop cable buffer tubes are spliced to the drop side pigtails.

Figure 11:
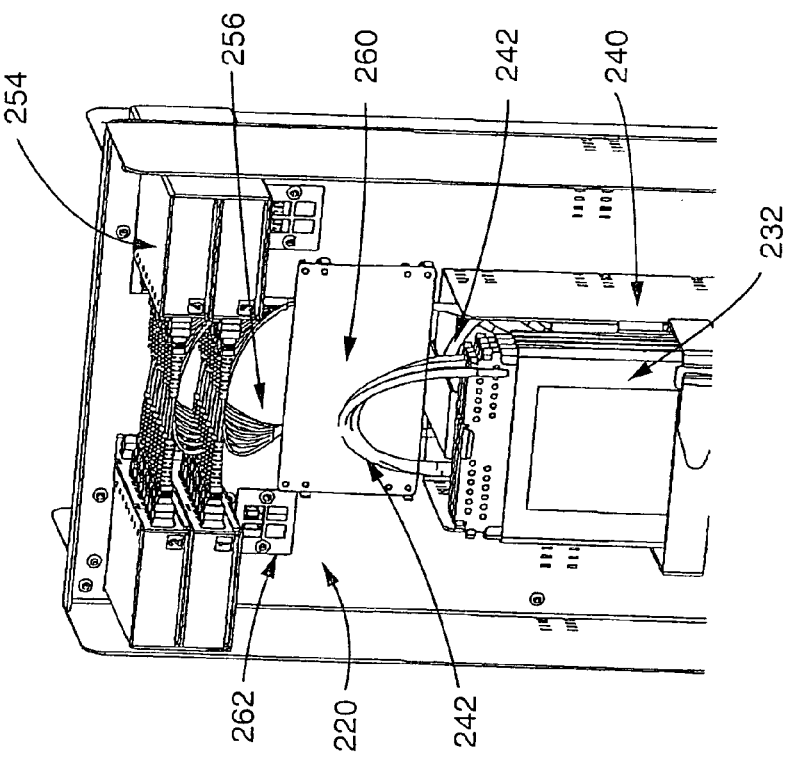
FIG. 11 is an enlarged, partial rear perspective. view of the fiber optic splice enclosure of FIG. 8 showing the fiber pigtail protection plate and a pass-through connector adaptor on the drop side of the enclosure.
Figure 13:
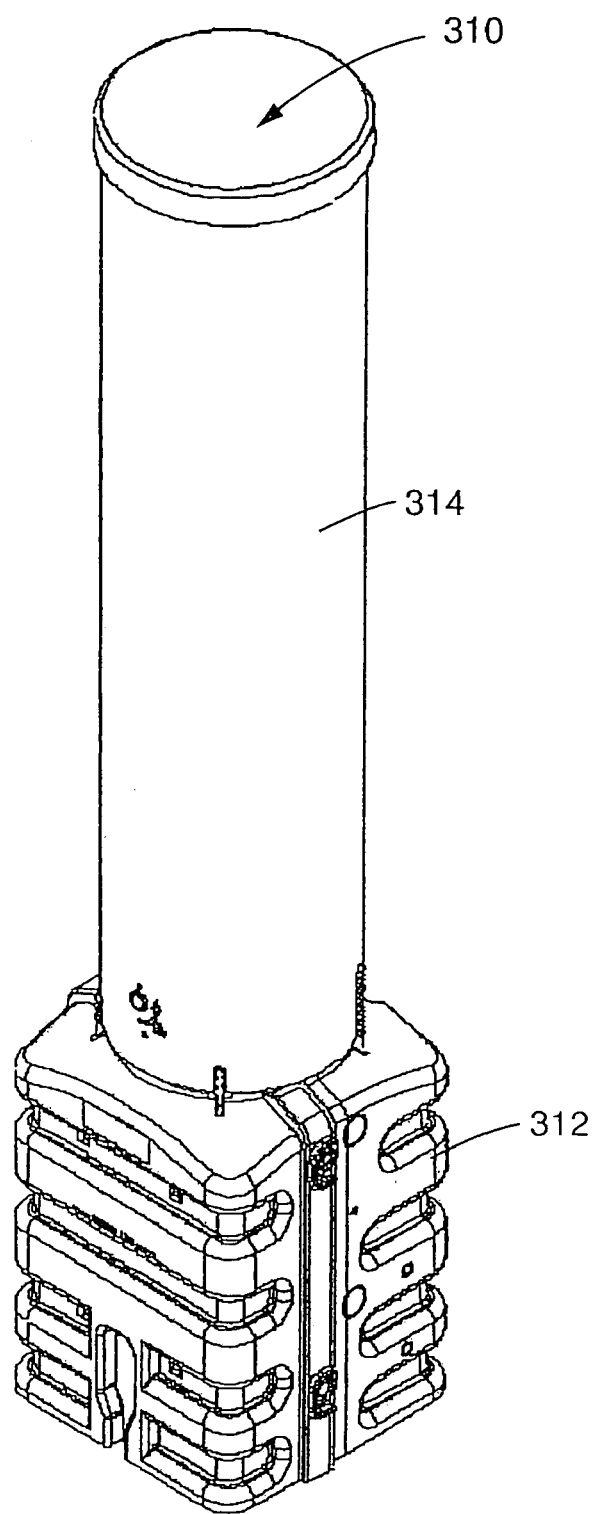
FIG. 13 is a front perspective view of another alternative embodiment of a fiber optic splice enclosure according to the invention.

In order to protect and help keep the pigtails 256, 257 separated from the express buffer tubes and other tubes and cables, the splice enclosure 210 of FIGS. 8-12 includes pigtail protection plates 260 on both the central office side and the drop side of the internal support frame 216. In this case, the pigtail protection plates 260 are arranged over the pigtails 256, 257 as they extend between the spliced slack storage baskets 240 and the connector interface adaptor 254 as best shown in FIG. 11 (showing the drop side pigtail protection plate). The pigtail protection plates 260 are disposed a short distance above the backboard 220 so that a space is created between the protection plates and the backboard for the pigtails. The pigtail protection plates 260 can be designed as a part that is snapped in place by a technician over the pigtails after they have been routed up to the connector adaptor interface 254.

As shown in FIG. 11, the fiber optic splice enclosure 210 of FIGS. 8-12 can also include a pass-through connector adaptor 262 that permits circuits to pass from the central office side of the enclosure to the drop side without using splitters. In the illustrated embodiment, this pass through connector adaptor 262 is located below the connector interface adaptor 254 and includes space for the connectors of eight pigtails 256 from the central office side to be connected to the connectors of eight corresponding pigtails 257 on the drop side. Of course, as will be appreciated, the pass-through connector adaptor 262 can have any number of connector locations.

Figure 12:
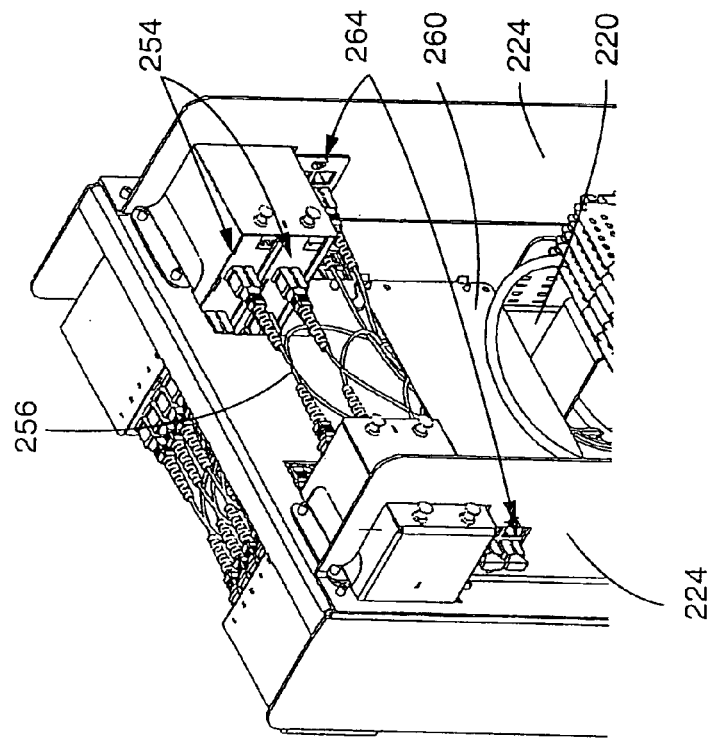
FIG. 12 is an enlarged, partial front perspective view of the fiber optic splice enclosure of FIG. 8 showing a redundant connector storage adaptor on the central office side of the enclosure.

As a further feature, the fiber optic splice enclosure 210 of FIGS. 8-12 can include a redundant connector storage adaptor 264. More specifically, as shown in FIG. 12, the central office side of the fiber optic splice enclosure 210 can include a redundant connector storage adaptor 264 with a plurality of storage locations where the connectors of redundant pigtails (i.e., pigtails not connected to pigtails on the drop side) that may be spliced during an initial installation can be stored for future use. In this case, a redundant connector storage adaptor 264 is provided on each sideboard 224 below the main connector interface adaptor 254. Of course, the redundant connector storage adaptor 264 can be provided in any location and can include any number of storage locations.

A further embodiment of a fiber optic splice enclosure according to the present invention is illustrated in FIGS. 13-21. In the drawings and description of embodiment of FIGS. 13-21, elements the same or generally similar to those of the embodiments described above are identified with the same reference number in the 300s series (e.g., splice enclosure 310). While the fiber optic splice enclosure 310 of FIGS. 13-21 has a pedestal-type configuration, there are several key distinctions as compared to the pedestal style enclosures illustrated in FIGS. 1-12. For example, in the FIGS. 13-21 embodiment, the base section 312 has a generally rectangular configuration. This rectangular configuration allows the enclosure 310 to be substantially self-supporting (i.e., supported without any mounting stakes or other mounting hardware) in the ground. In this case, the walls of the base section 312 also have a corrugated configuration that both increases their strength and allows the dirt or gravel to better infiltrate around the base section making the base section harder to remove from the ground.

Figure 14:
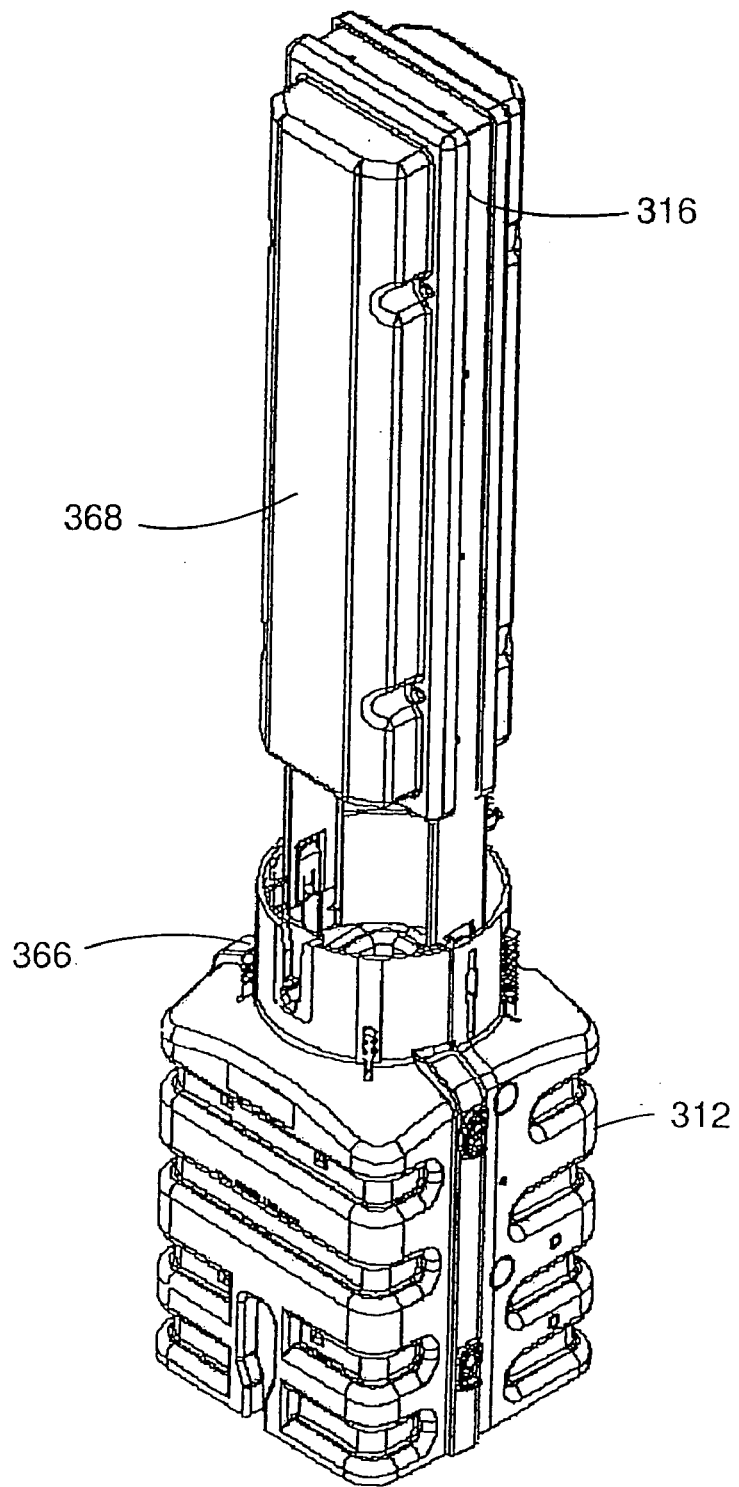
FIG. 14 is a front perspective view of the fiber optic splice enclosure of FIG. 13 with the cover removed.

To enable the base section 312 to mate with standard generally cylindrical covers that are in common use in the telecommunications industry, the rectangular base section includes a cylindrical neck 366 (see FIG. 14). In order to facilitate repair or replacement of the fiber optic cables or other equipment associated with the fiber optic splice enclosure as well as to facilitate rehabbing of older enclosures, the base section 312 on the enclosure of FIGS. 13-21 can have a split configuration. Specifically, the base section 312 can include mating front and rear housings that can be selectively separated from each other even after the fiber optic splice enclosure has been installed in the field without disturbing the internal support frame.

Figure 15:
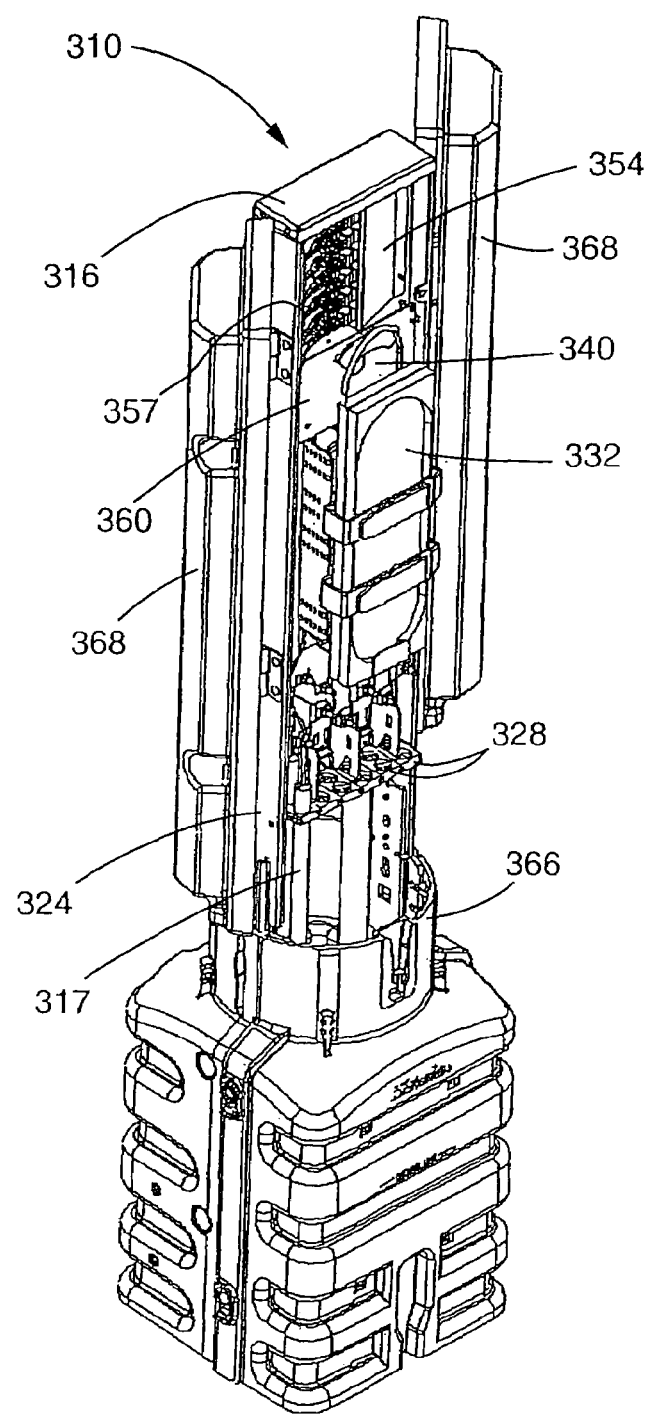
FIG. 15 is a front perspective view of the fiber optic splice enclosure of FIG. 13 (with the cover removed) showing the drop side of the enclosure with the weather tight doors open.
Figure 16:
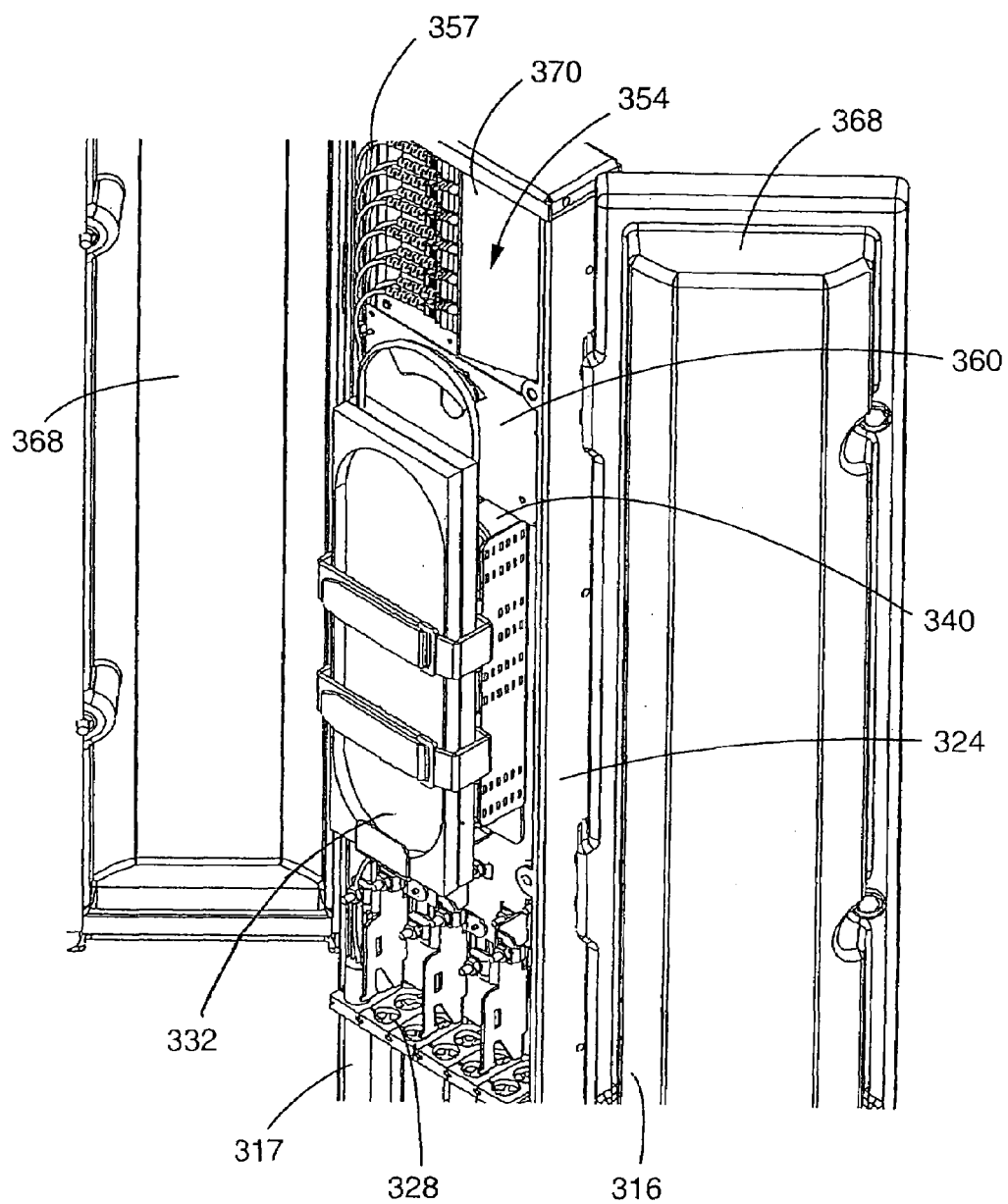
FIG. 16 is an enlarged, partial front perspective view of the fiber optic splice enclosure of FIG. 13 showing the drop side of the enclosure with the weather tight doors open.
Figure 17:
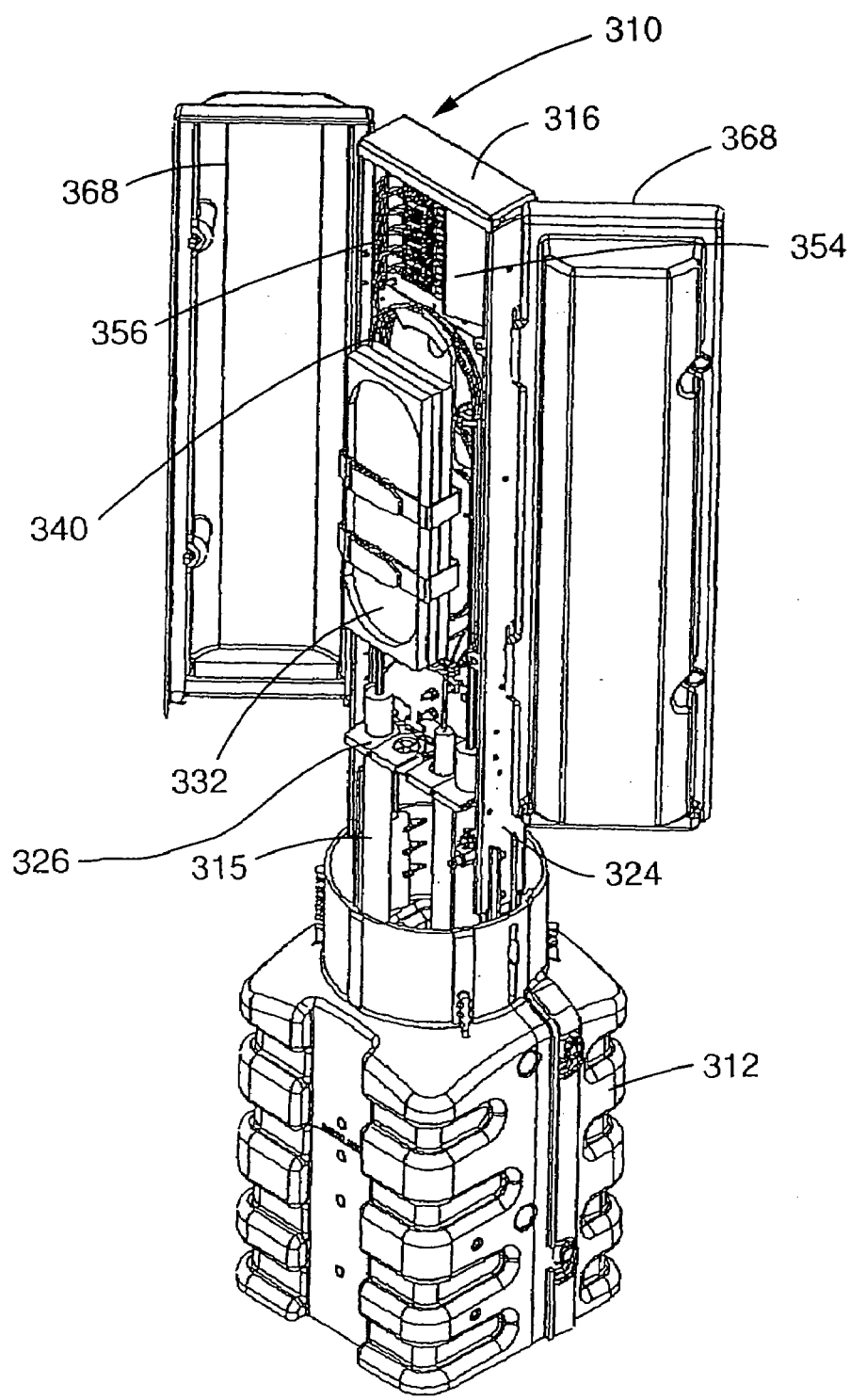
FIG. 17 is a rear perspective view of the fiber optic splice enclosure of FIG. 13 (with the cover removed) showing the central office side of the enclosure with the weather tight doors open.
Figure 18:
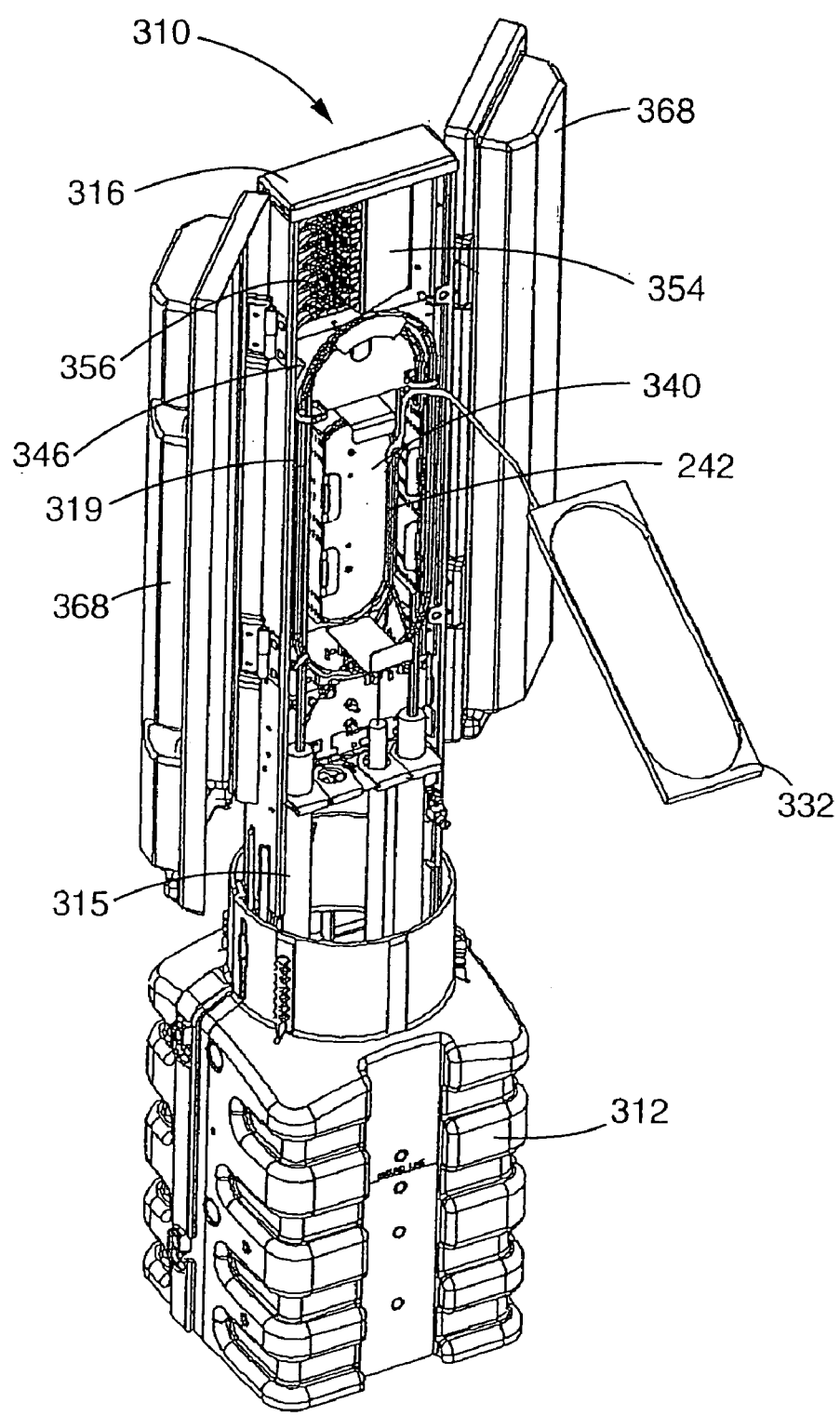
FIG. 18 is a rear perspective view of the fiber optic splice enclosure of FIG. 13 showing the central office side of the enclosure with one of the splice trays detached and pulled out from the internal support frame.

As with the embodiment illustrated in FIGS. 8-12, the fiber optic splice enclosure of FIGS. 13-21 has discrete central office (FIGS. 17-19) and drop sides (FIGS. 15-16). However, in contrast to the FIGS. 8-12 embodiment, each side of the splice enclosure 310 of FIGS. 13-21 has its own weather tight door 368. In this case, each door 368 is hinged to one of the sideboards 324 of the internal support frame 316 for movement between an open position (see FIGS. 15 and 17), wherein a technician can access the cables, buffer tubes and splices on the respective side of the enclosure, and a closed position (see FIG. 14) where the respective side of the enclosure is sealed against inclement weather conditions such as wind driven dust, rain and snow. If desired, each door 368 can be keyed to guard against unauthorized entry. Additionally, the hinges allow each door to be removed from the sideboards 324 to allow better access and freedom for the technician to work.

Figure 19:
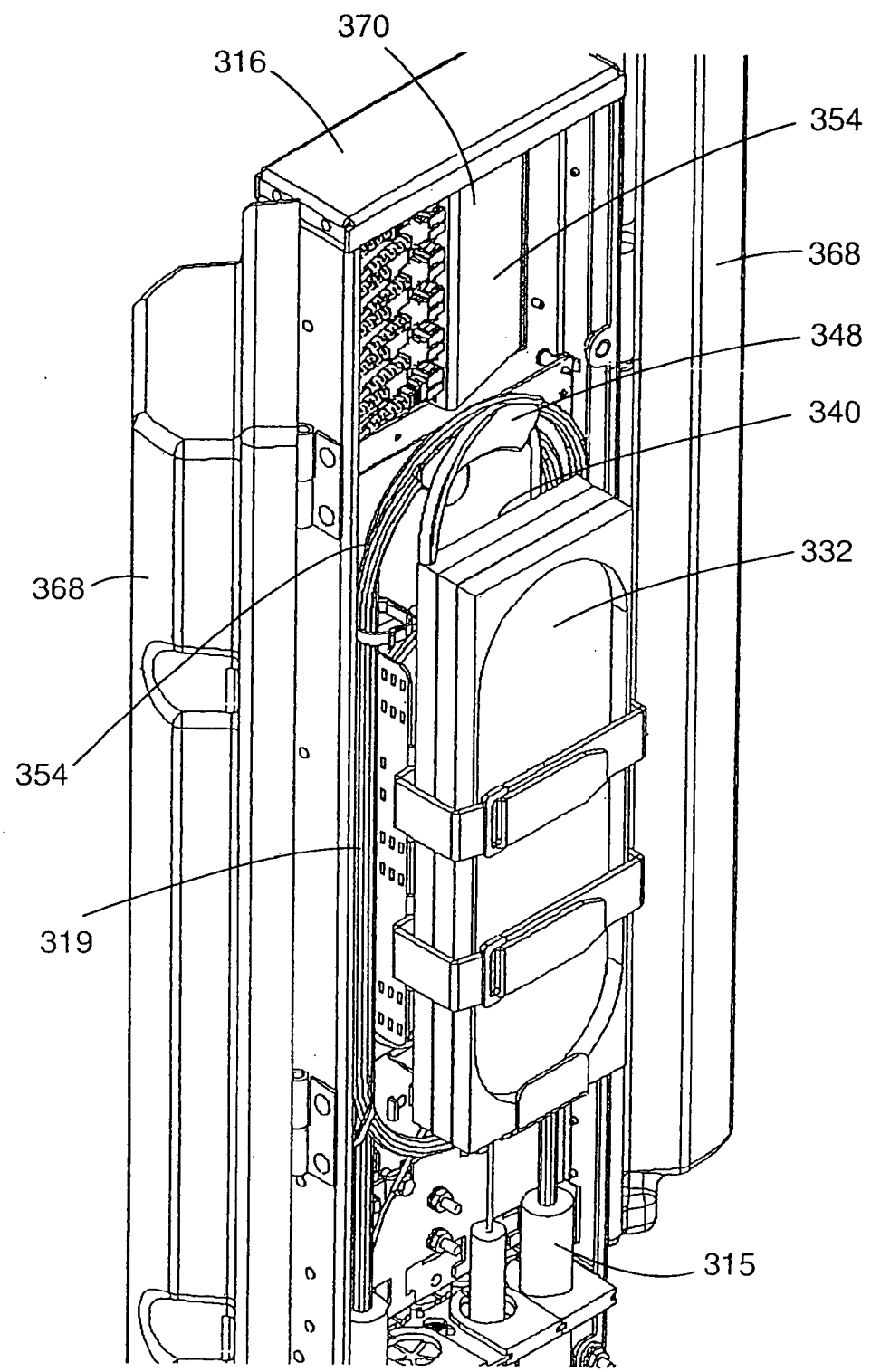
FIG. 19 is an enlarged, partial rear perspective view of the fiber optic splice enclosure of FIG. 13 showing the central office side of the enclosure.

As with the FIGS. 8-12 embodiment, the fiber optic splice enclosure 310 of FIGS. 13-21 utilizes pigtails 356, 357 and a connectorized interface between the central office and drop sides that provides a good demarcation between the sides for technicians. Moreover, the central office and drop sides of the FIGS. 13-21 enclosure 310 each have mounting tabs or brackets 326, 328 to which the feeder and drop cables can be secured, a spliced slack storage basket 340, pigtail protection plates 360, one or more splice trays 332 and a connector adaptor interface 354. The central office side of the internal support frame 316 also includes an express buffer tube storage area 346 that, in this case, is arranged around the spliced slack storage basket 340 and is defined by cable guides 348 as best shown in FIG. 19.

Figure 20:
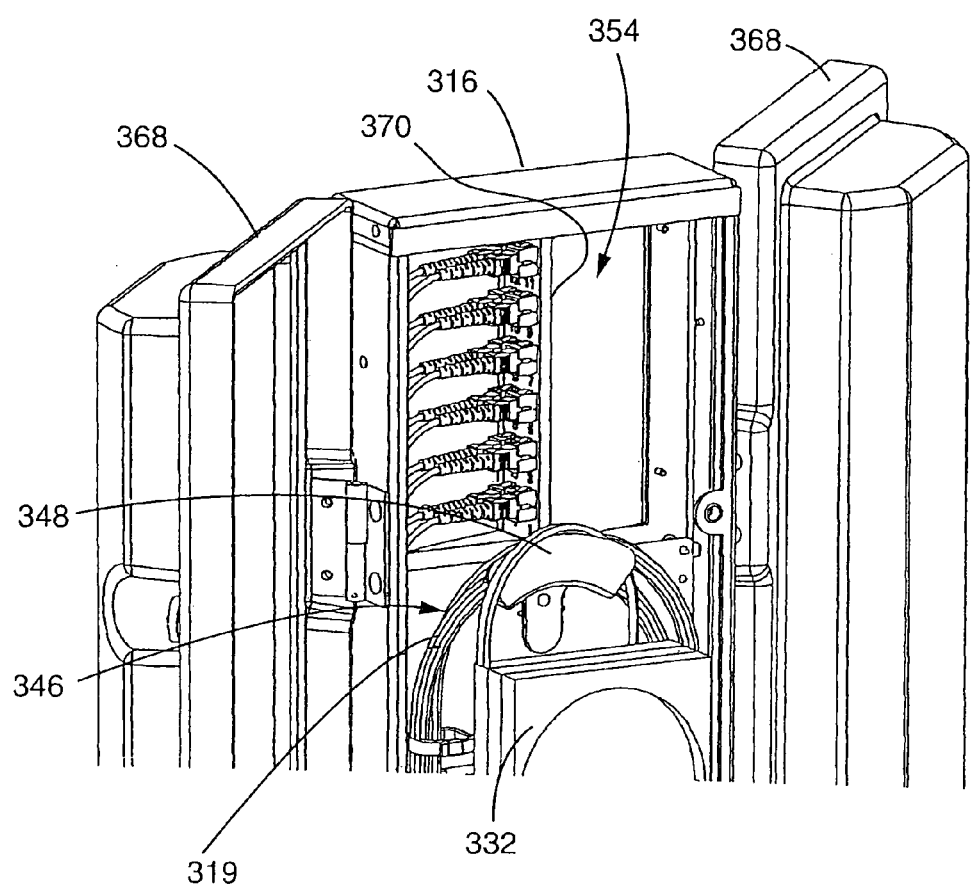
FIG. 20 is an enlarged, partial rear perspective view of the fiber optic splice enclosure of FIG. 13 showing the connectorized interface on the central office side of the enclosure.
Figure 21:
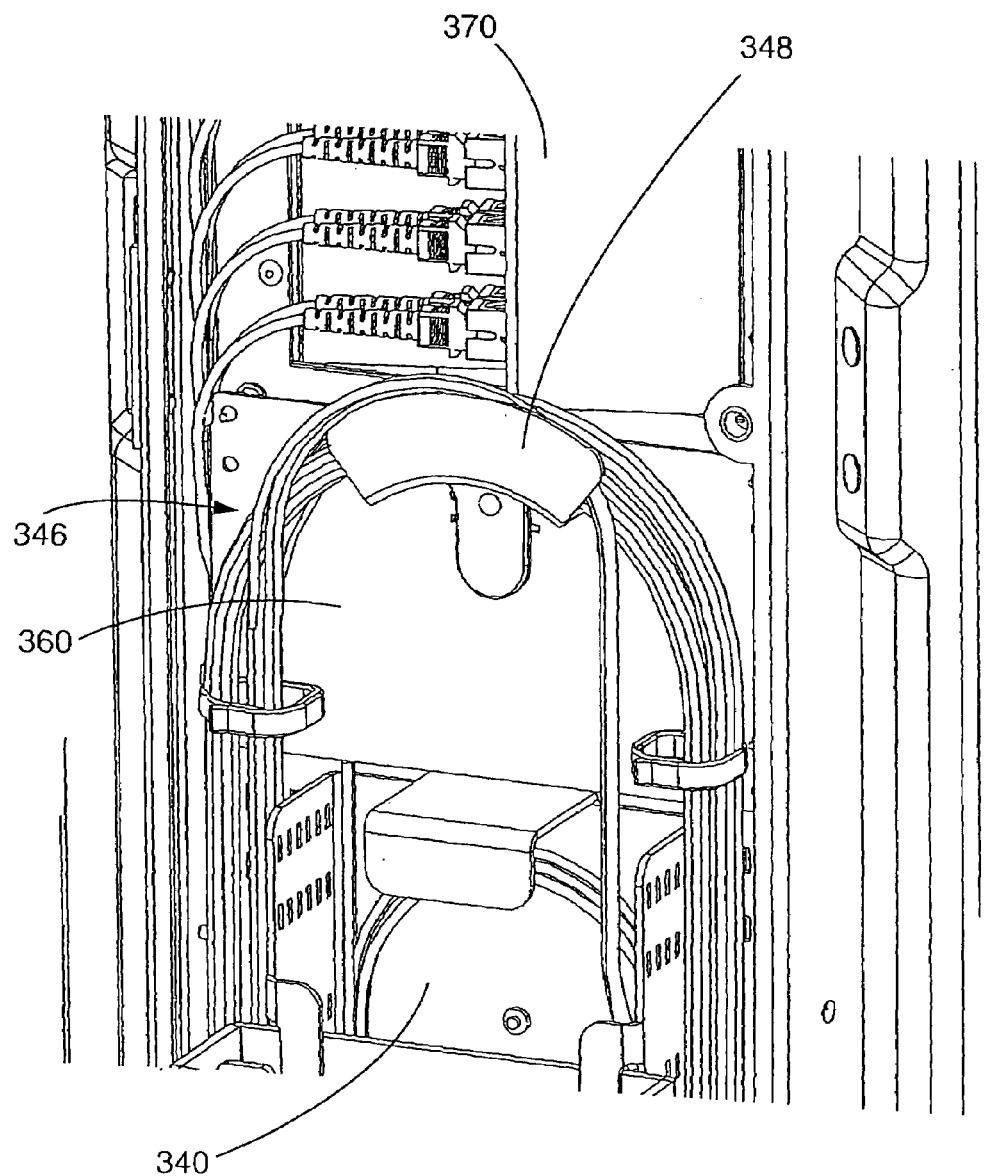
FIG. 21 is an enlarged, partial rear perspective view of the fiber optic splice enclosure of FIG. 13 showing the pigtail protection plate on the central office side of the enclosure.

Unlike the FIGS. 8-12 embodiment, the connector adaptor interface 354 in the fiber optic splice enclosure 310 of FIGS. 13-21 does not include any modular splitters. Instead, each pigtail 356 from the central office side connects to a respective one of the pigtails 357 on the drop side through the connector adaptor interface 354. Moreover, in order to help save on space inside the enclosure, the connector adaptor interface utilizes a Z-bracket 370. As best shown in FIGS. 19 and 20, the Z-bracket 370 (which has a Z-shaped configuration when viewed from the top of the internal storage frame) is arranged near the top of the backboard 320 and includes on each side of the backboard a portion that protrudes out from the backboard and a portion that is recessed inward past the surface of the backboard (so as to protrude from the respective opposite side of the backboard). The connector locations of the connector adapter interface 354 are arranged along the leg that joins these two portions so that the distance that the connectors on the pigtails protrude out from the backboard 320 is minimized.

Figure 22:
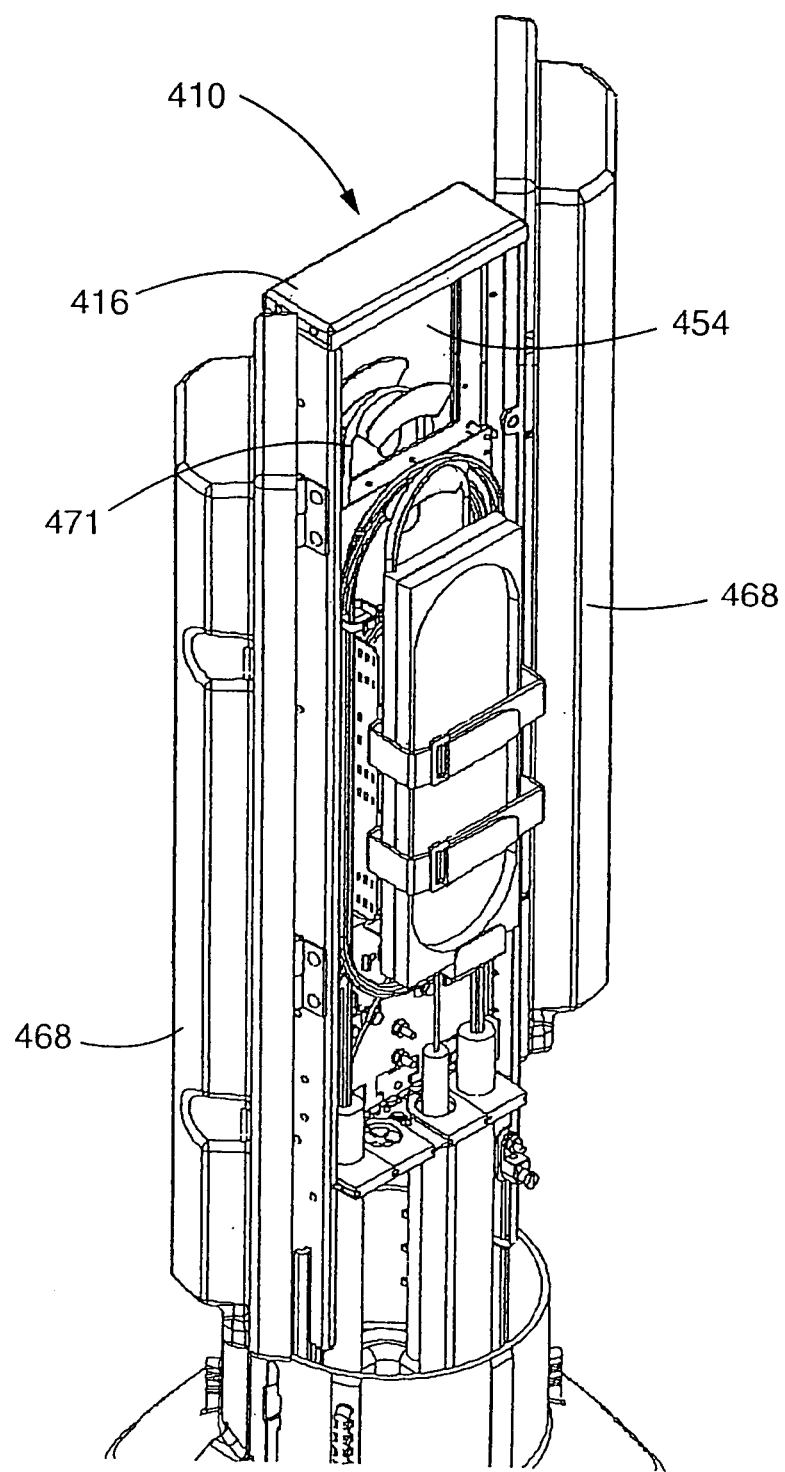
FIG. 22 is an enlarged partial perspective view of the central office side of an alternative embodiment of a fiber optic splice enclosure according to the present invention that is similar to the embodiment of FIGS. 13-21, but that includes a pass through interface between the central office and drop sides.
Figure 23:
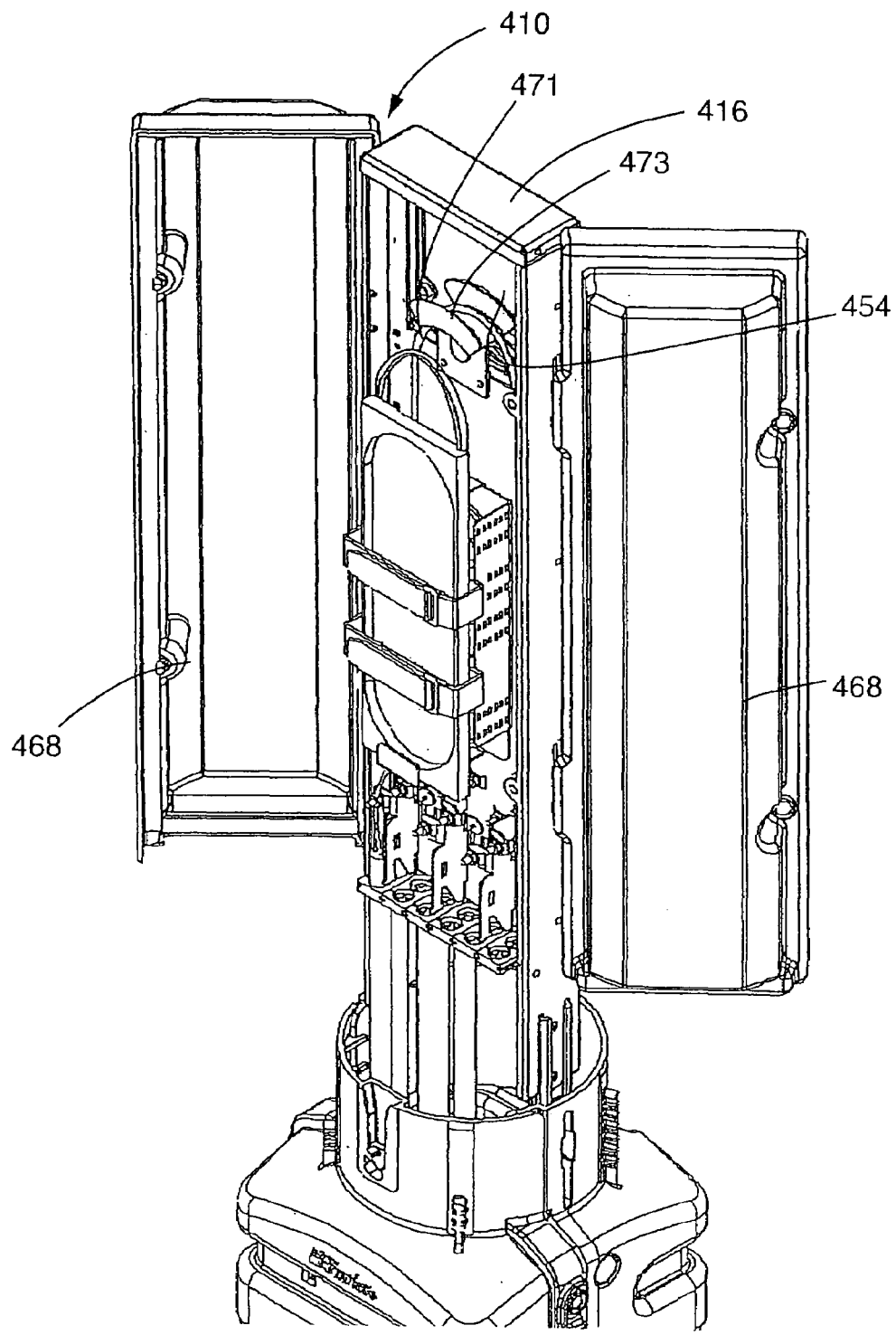
FIG. 23 is an enlarged partial perspective view of the drop side of the fiber optic splice enclosure of FIG. 22.

A modification of the embodiment of the embodiment of FIGS. 13-21 is illustrated in FIGS. 22 and 23. In the drawing and description of embodiment of FIGS. 22 and 23, elements the same or generally similar to those in the embodiments described above are identified with the same reference number in the 400s series (e.g., splice enclosure 410). The fiber optic splice enclosure of FIGS. 22 and 23 includes the double door 468 internal support frame 416 of the FIGS. 13-21 embodiment and discrete central office (FIG. 22) and drop sides (FIG. 23). However, instead of a connector adaptor interface between the central office and drop sides of the backboard 320, the enclosure of FIGS. 22 and 23 includes a pass through interface 454 between the central office and drop sides that, in this case, comprises an opening arranged near the top of the backboard through which fibers in transport tubes 471 (one being shown in FIGS. 22 and 23) can pass between the two sides of the enclosure. To facilitate routing of the transport tubes through the pass-through interface 454, a saddle shaped tube guide 473 is provided adjacent the pass-through interface on, in this case, the drop side of the enclosure.

Figure 24:
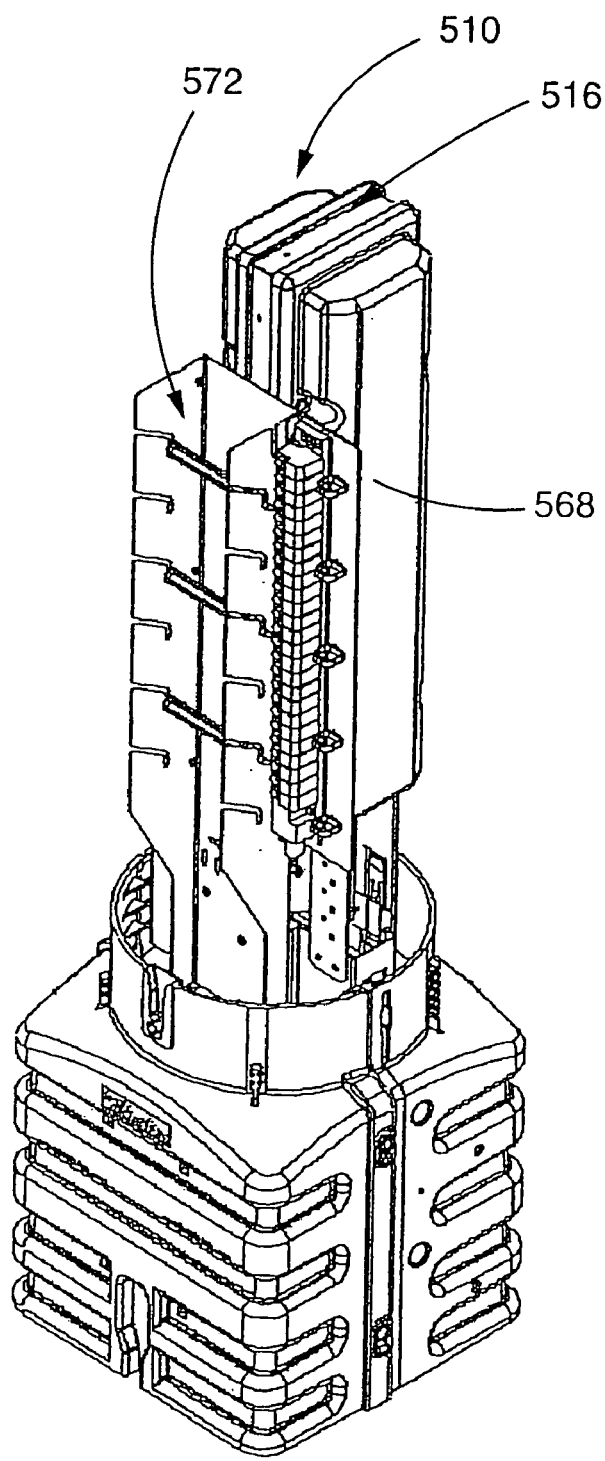
FIG. 24 is a front perspective view of another alternative embodiment of a fiber optic splice enclosure according to the present invention that also supports copper splicing.
Figure 25:
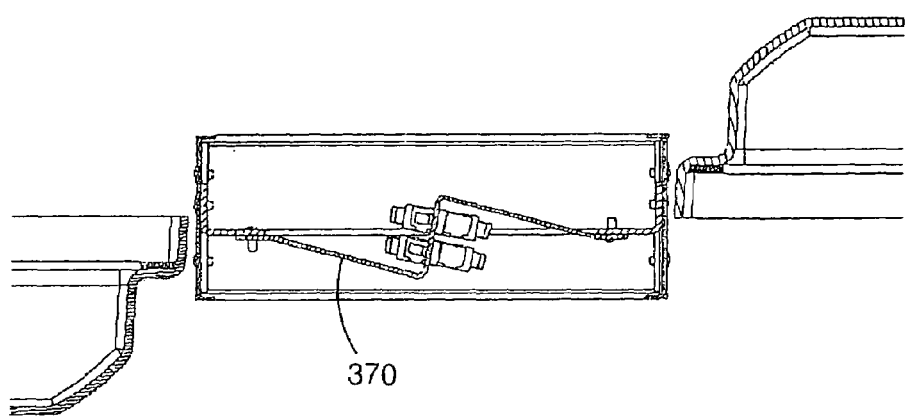
FIG. 25 is a horizontal cross-sectional view of the Z-bracket connector interface of the fiber optic splice enclosure of FIGS. 12-14.

A further modification of the embodiment of FIGS. 13-21 is illustrated in FIG. 24. In the drawing and description of embodiment of FIG. 24, elements the same or generally similar to those in the embodiments described above are identified with the same reference number in the 500s series (e.g., splice enclosure 510). The fiber optic splice enclosure 510 of FIG. 22 includes the double door 568 internal support frame 516 of the FIGS. 13-21 embodiment for organizing the fiber optic splices along with a separate copper organizing frame 572 in the same enclosure. As shown in FIG. 24, the fiber optic organizing support frame 516 and copper organizing frame 572 can be arranged side-by-side inside the enclosure 510 with one of the legs of the fiber support frame connected to the copper organizing support frame. In this case, the copper organizing support frame 572 includes bars for supporting copper splices along with a location to mount a copper distribution terminal. As will be appreciated the enclosure of FIG. 24, is particularly suited for distribution points where there are both copper and fiber optic telecommunications cables.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any nonclaimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fiber optic splice enclosure for housing an interconnection contained in a splice tray between at least one optical fiber of a feeder cable and at least one optical fiber of a drop cable, the optical fiber of the feeder cable being at least partially contained in a spliced feeder cable buffer tube and the optical fiber of the drop cable being at least partially contained in a spliced drop cable buffer tube, wherein the feeder cable or the drop cable includes one or more express buffer tubes that extend uninterrupted through the enclosure, the fiber optic splice enclosure comprising:

a support frame arranged in the enclosure, the support frame including cable attachment positions for attaching the feeder cable and the drop cable;

a basket arranged on the support frame and defining a containment structure having an area smaller than a surface area of the support frame for storing slack of the spliced feeder cable buffer tube and the spliced drop cable buffer tube transitioning to the splice tray, the basket being spaced away from the cable attachment positions of the support frame;

an express buffer tube storage arrangement arranged on the support frame separate from the basket, the express buffer tube storage arrangement being sized to receive a substantial portion of the one or more express buffer tubes; and a splice tray mounting arrangement arranged near the basket for supporting the splice tray, the splice tray mounting arrangement being configured such that the splice tray is removable and wherein the basket is sized so as to be able to store sufficient slack of the spliced feeder cable buffer tube and the spliced drop cable buffer tube while maintaining a predetermined tube bend radius such that the splice tray is movable to a working position outside the enclosure.

2. The fiber optic splice enclosure according to claim 1 further comprising:

an unsealed pedestal base having a height that a portion thereof can be buried underground with a further portion thereof extending aboveground; and a dome extending over the support frame and engageable with the base.

3. The fiber optic splice enclosure according to claim 1 wherein the express buffer tube storage arrangement is provided in surrounding relation to the basket.

4. The fiber optic splice enclosure according to claim 1 wherein the support frame has opposing first and second sides and the basket is arranged on the first side and the express buffer tube storage arrangement is arranged on the second side.

5. The fiber optic splice enclosure according to claim 1 wherein the support frame is configured with brackets for receiving copper cable interconnections.

6. The fiber optic splice enclosure according to claim 1 wherein the splice tray mounting arrangement includes a support member that cantilevers out from the support frame so as to define a surface on which the splice trays can rest.

7. A fiber optic splice enclosure for housing an interconnection between at least one optical fiber of a feeder cable and at least one optical fiber of a drop cable, the spliced optical fiber of the feeder cable being at least partially contained in a spliced feeder cable buffer tube and the spliced optical fiber of the drop cable being at least partially contained in a spliced drop cable buffer tube, the spliced feeder cable buffer tube being connected to a pigtail or transport tube through a first splice tray and the spliced drop cable buffer tube being connected to a pigtail or a transport tube through a second splice tray, wherein the feeder cable or the drop cable can include one or more express buffer tubes that extend uninterrupted through the enclosure, the fiber optic splice enclosure comprising:

a support frame arranged in the enclosure, the support frame including a central office side and a drop side;

a first basket arranged on the central office side of the support frame for storing slack of the spliced feeder cable buffer tube and the pigtail or transport tube transitioning to the first splice tray;

a first splice tray mounting arrangement carried by the support frame and arranged near the first basket for supporting the first splice tray, the first splice mounting arrangement being configured such that the first splice tray is removable and wherein the first basket is sized so as to be able to store sufficient slack of the spliced feeder cable buffer tube and pigtail or transport tube while maintaining a predetermined tube bend radius such that the first splice tray is movable to a working position outside the enclosure;

a second basket arranged on the drop side of the support frame for storing slack of the spliced drop cable buffer tube and pigtail or transport tube transitioning to the second splice tray;

a second splice tray mounting arrangement arranged near the second basket for supporting the second splice tray, the splice mounting arrangement being configured such that the second splice tray is removable and wherein the second basket is sized so as to be able to store sufficient slack of the spliced drop cable buffer tube and transport tube or pigtail while maintaining a predetermined tube bend radius such that the second splice tray is movable to a working position outside the enclosure; and an express buffer tube storage arrangement arranged on the support frame separate from the first and second baskets.

8. The fiber optic splice enclosure according to claim 7 wherein the enclosure is configured as a pedestal.

9. The fiber optic splice enclosure according to claim 7 wherein the express buffer tube storage arrangement is arranged on the central office side of the support frame in surrounding relation to the first basket.

10. The fiber optic splice enclosure according to claim 7 wherein the support frame is configured to also support copper cable interconnections.

11. The fiber optic splice enclosure according to claim 7 wherein the first and second splice tray mounting arrangements each include a support member that cantilevers out from the respective side of the support frame so as to define a surface on which the splice trays can rest.

12. The fiber optic splice enclosure according to claim 7 further including a first weather tight door carried by the support frame for enclosing the central office side of the support frame and a second weather tight door carried by the support frame for enclosing the drop side of the support frame.

13. The fiber optic splice enclosure according to claim 7 further including an interface between the central office side and drop side, the interface being arranged on the support frame.

14. The fiber optic splice enclosure according to claim 13 further including a first protection plate supported on the central office side of the support frame to separate and protect a pigtail or transport tube as the pigtail or transport tube extends from the first basket to the 1 interface.

15. The fiber optic splice enclosure according to claim 14 further including a second protection plate supported on the drop side of the support frame to separate and protect a pigtail or transport tube as the pigtail or transport tube extends from the second basket to the interface.

16. The fiber optic splice enclosure according to claim 13 wherein the interface is a connector interface.

17. The fiber optic splice enclosure according to claim 16 wherein the interface includes on each side of the support frame a portion that protrudes outward from the respective side of the support frame and portion that is recessed inward from the respective side of the support frame such that the interface has a generally Z-shaped configuration.

18. The fiber optic splice enclosure according to claim 13 wherein the interface is a pass through interface.

19. A fiber optic splice enclosure for housing an interconnection between at least one optical fiber of a feeder cable and at least one optical fiber of a drop cable, the fiber optic splice enclosure comprising:
a support frame arranged in the enclosure, the support frame including a central office side and a drop side;
a first weather tight door carried by the support frame for enclosing the central office side of the support frame;
a second weather tight door carried by the support frame for enclosing the drop side of the support frame; and
a dome that is removably positionable so as to enclose the support frame and the first and second weather tight doors.

20. The fiber optic splice enclosure according to claim 19 wherein the support frame is configured to also support copper cable interconnections.

21. A fiber optic splice enclosure for housing an interconnection between at least one optical fiber of a feeder cable and at least one optical fiber of a drop cable, at least one of the spliced optical fibers of the feeder cable and the spliced optical fiber of the drop cable being at least partially contained in a spliced buffer tube, the spliced buffer tube being connected to a transport tube or a pigtail through a splice tray, the fiber optic splice enclosure comprising:
a support frame arranged in the enclosure, the support frame including a central office side and a drop side;
an interface between the central office side and the drop side, the interface being arranged on the support frame;
a basket arranged on the support frame for storing slack of the spliced buffer tube and the pigtail or transport tube transitioning to the splice tray; and
a protection plate supported on the support frame, the protection plate being sized to overlap the portion of the pigtail or transport tube extending from the basket to the interface.

22. The fiber optic splice enclosure according to claim 21 wherein the enclosure is configured as a pedestal.

23. The fiber optic splice enclosure according to claim 21 wherein the interface is a connector interface.

24. The fiber optic splice enclosure according to claim 23 wherein the interface includes on each side of the support frame a portion that protrudes outward from the respective side of the support frame and portion that is recessed inward from the respective side of the support frame such that the interface has a generally Z-shaped configuration.

25. The fiber optic splice enclosure according to claim 21 wherein the interface is a pass through interface.

26. A fiber optic splice enclosure for housing an interconnection between at least one optical fiber of a feeder cable and multiple optical fibers of a drop cable, the interconnected optical fiber of the feeder cable being connected to a central office side pigtail and each of the interconnected optical fibers of the drop cable being connected to respective drop side pigtails, the fiber optic splice enclosure comprising:
a support frame arranged in the enclosure, the support frame including a central office side and a drop side;
a splice tray mounting arrangement carried by the support frame on at least one of the central office side and the drop side, the splice tray mounting arrangement including a support member that cantilevers out from the respective side of the support frame so as to define a surface on which a splice tray can rest; and
a connector interface between the central office side and the drop side, the connector interface including at least one splitter for connecting a central office side pigtail to multiple drop side pigtails.

27. The fiber optic splice enclosure according to claim 26 wherein the enclosure is configured as a pedestal.

28. The fiber optic splice enclosure according to claim 26 further including a protection plate supported on the central office side of the support frame for protecting the central office side pigtail as the central office pigtail extends to the connector interface.

29. The fiber optic splice enclosure according to claim 26 further including a protection plate supported on the drop side of the support frame for protecting the drop side pigtails as the drop side pigtails extend to the connector interface.

30. A fiber optic splice enclosure for housing an interconnection contained in a splice tray between at least one optical fiber of a feeder cable and at least one optical fiber of a drop cable, the optical fiber of the feeder cable being at least partially contained in a spliced feeder cable buffer tube and the optical fiber of the drop cable being at least partially contained in a spliced drop cable buffer tube, wherein the feeder cable or the drop cable includes one or more express buffer tubes that extend uninterrupted through the enclosure, the fiber optic splice enclosure comprising:
a support frame arranged in the enclosure;
a basket arranged on the support frame and defining a containment structure having an area smaller than a surface area of the support frame for storing slack of the spliced feeder cable buffer tube and the spliced drop cable buffer tube transitioning to the splice tray;
an express buffer tube storage arrangement arranged on an outer-surface of the support frame separate from the basket; and
a splice tray mounting arrangement arranged near the basket for supporting the splice tray, the splice tray mounting arrangement being configured such that the splice tray is removable and wherein the basket is sized so as to be able to store sufficient slack of the spliced feeder cable buffer tube and the splice drop cable buffer tube while maintaining a predetermined tube bend radius such that the splice tray is movable to a working position outside the enclosure.

31. A fiber optic splice enclosure for housing an interconnection between at least one optical fiber of a feeder cable and at least one optical fiber of a drop cable, the fiber optic splice enclosure comprising:
a support frame arranged in the enclosure;
an express buffer tube storage arrangement arranged on the support frame;
a basket arranged on the support frame and defining a containment structure having an area smaller than a surface area of the support frame for storing slack buffer tubes, the basket having an open front end; and
a splice tray mounting arrangement supported on the support frame for supporting a splice tray outwardly and immediately in front of the basket, the splice tray mounting arrangement being configured such that the splice tray is removable.

32. A fiber optic splice enclosure for housing an interconnection contained in a splice tray between at least one optical fiber of a feeder cable and at least one optical fiber of a drop cable, the optical fiber of the feeder cable being at least partially contained in a spliced feeder cable buffer tube and the optical fiber of the drop cable being at least partially contained in a spliced drop cable buffer tube, wherein the feeder cable or the drop cable includes one or more express buffer tubes that extend uninterrupted through the enclosure, the fiber optic splice enclosure comprising:
- a support frame arranged in the enclosure;
- a basket arranged on the support frame for storing slack of the spliced feeder cable buffer tube and the spliced drop cable buffer tube transitioning to the splice tray;
- an express buffer tube storage arrangement arranged on the support frame separate from the basket, the express buffer tube storage arrangement being sized to receive a substantial portion of the one or more express buffer tubes; and
- a splice tray mounting arrangement arranged near the basket for supporting the splice tray, the splice tray mounting arrangement being configured such that the splice tray is removable and including a support member that cantilevers out from the support frame so as to define a surface on which the splice trays can rest, wherein the basket is sized so as to be able to store sufficient slack of the spliced feeder cable buffer tube and the spliced drop cable buffer tube while maintaining a predetermined tube bend radius such that the splice tray is movable to a working position outside the enclosure.

33. A fiber optic splice enclosure for housing an interconnection contained in a splice tray between at least one optical fiber of a feeder cable and at least one optical fiber of a drop cable, the optical fiber of the feeder cable being at least partially contained in a spliced feeder cable buffer tube and the optical fiber of the drop cable being at least partially contained in a spliced drop cable buffer tube, wherein the feeder cable or the drop cable includes one or more express buffer tubes that extend uninterrupted through the enclosure, the fiber optic splice enclosure comprising:
- a support frame arranged in the enclosure;
- an unsealed pedestal base having a height that a portion thereof can be buried underground with a further portion thereof extending aboveground;
- a dome extending over the support frame and engageable with the base;
- a basket arranged on the support frame and defining a containment structure having an area smaller than a surface area of the support frame for storing slack of the spliced feeder cable buffer tube and the spliced drop cable buffer tube transitioning to the splice tray;
- an express buffer tube storage arrangement arranged on the support frame separate from the basket, the express buffer tube storage arrangement being sized to receive a substantial portion of the one or more express buffer tubes; and
- a splice tray mounting arrangement arranged near the basket for supporting the splice tray, the splice tray mounting arrangement being configured such that the splice tray is removable and wherein the basket is sized so as to be able to store sufficient slack of the spliced feeder cable buffer tube and the spliced drop cable buffer tube while maintaining a predetermined tube bend radius such that the splice tray is movable to a working position outside the enclosure.

* * * * *